(12) United States Patent
Ehrnberg

(10) Patent No.: US 10,364,830 B2
(45) Date of Patent: Jul. 30, 2019

(54) PUMP DEVICE FOR CONVERTING ROTATION INTO FLUID FLOW

(71) Applicant: Ehrnberg Solutions AB, Steninge (SE)

(72) Inventor: Daniel Ehrnberg, Steninge (SE)

(73) Assignee: Spira Energy AB, Steninge (SE)

( * ) Notice: Subject to any disclaimer, the term of this patent is extended or adjusted under 35 U.S.C. 154(b) by 281 days.

(21) Appl. No.: 15/524,254

(22) PCT Filed: Nov. 19, 2015

(86) PCT No.: PCT/SE2015/051249
§ 371 (c)(1),
(2) Date: May 3, 2017

(87) PCT Pub. No.: WO2016/080902
PCT Pub. Date: May 26, 2016

(65) Prior Publication Data
US 2018/0119710 A1    May 3, 2018

(30) Foreign Application Priority Data

Nov. 20, 2014   (SE) ...................... 1451403

(51) Int. Cl.
| | |
|---|---|
| *F04F 1/06* | (2006.01) |
| *F03B 17/06* | (2006.01) |
| *F04B 19/12* | (2006.01) |

(52) U.S. Cl.
CPC .............. *F04F 1/06* (2013.01); *F03B 17/061* (2013.01); *F04B 19/12* (2013.01);
(Continued)

(58) Field of Classification Search
CPC ........... F04F 1/06; F04B 19/12; F03B 17/061; F03B 17/063; F03B 13/10; Y02E 10/28; F05B 2250/15; F05B 2210/18
(Continued)

(56) References Cited

U.S. PATENT DOCUMENTS

| | | | | |
|---|---|---|---|---|
| 157,191 | A | * | 11/1874 | Cameron ................ B27L 5/025 417/94 |
| 210,023 | A | * | 11/1878 | Gray ........................ B05B 3/06 239/251 |

(Continued)

FOREIGN PATENT DOCUMENTS

| | | |
|---|---|---|
| DE | 10100534 | 7/2002 |
| DE | 10231008 | 1/2004 |

(Continued)

OTHER PUBLICATIONS

Johan Kjellgren; International Search Report, parent PCT Application No. PCT/SE2015/051249; dated Feb. 18, 2016, Swedish Patent Office, Stockholm, Sweden.

*Primary Examiner* — Charles G Freay
*Assistant Examiner* — Thomas Fink
(74) *Attorney, Agent, or Firm* — Babcock IP, PLLC

(57) ABSTRACT

The present invention relates to an apparatus for converting rotation into fluid flow and/or fluid flow into rotation. The apparatus comprises a first coiled fluid conduit and a second coiled fluid conduit and a fluid separator for separating a first fluid from a second fluid having a second density different from the first density. The fluid separator is configured in such a way that when, during rotation of the fluid conduits first mass portions of the first fluid and second mass portions of the second fluid are alternatingly transported by the first fluid conduit into or from the fluid separator, third mass portions of the first fluid and fourth mass portions of the second fluid are alternatingly transported from or to the fluid separator by the second fluid conduit. A ratio between each of the first mass portions and each of the second mass portions is substantially greater than a ratio between each of the third mass portions and each of the fourth mass portions.

(Continued)

This provides for a net flow of one of the first and second fluids through the apparatus.

27 Claims, 10 Drawing Sheets

(52) U.S. Cl.
CPC ....... *F05B 2210/18* (2013.01); *F05B 2250/15* (2013.01); *Y02E 10/28* (2013.01)

(58) Field of Classification Search
USPC .......................... 417/94–95; 415/88, 71–75
See application file for complete search history.

(56) References Cited

U.S. PATENT DOCUMENTS

| | | | | |
|---|---|---|---|---|
| 668,824 | A * | 2/1901 | Stone | F01D 1/32 415/63 |
| 896,581 | A * | 8/1908 | Robinson | B27L 5/025 417/137 |
| 932,446 | A * | 8/1909 | Comes | F04B 17/02 165/45 |
| 1,005,664 | A * | 10/1911 | Snyder | B27L 5/025 417/137 |
| 1,035,993 | A * | 8/1912 | Moore | B27L 5/025 417/137 |
| 1,134,432 | A * | 4/1915 | Breuer | B01D 47/06 261/29 |
| 1,373,175 | A * | 3/1921 | De Remer | F04B 39/0011 415/72 |
| 1,395,267 | A * | 11/1921 | Fisher | F04D 3/02 415/73 |
| 1,510,744 | A * | 10/1924 | Gillespie | F04B 19/12 417/137 |
| 1,720,999 | A * | 7/1929 | Cawley | F04B 19/12 415/88 |
| 2,190,968 | A * | 2/1940 | Acree | F04B 19/12 417/321 |
| 2,607,525 | A * | 8/1952 | McEvoy | F04D 17/18 417/94 |
| 2,633,290 | A * | 3/1953 | Schaefer | F04D 1/12 261/88 |
| 3,489,074 | A * | 1/1970 | Farkas | A23L 3/001 417/65 |
| 3,495,534 | A * | 2/1970 | Aikins | F04B 19/12 137/264 |
| 3,809,491 | A * | 5/1974 | Banyai | F04D 1/04 415/73 |
| 3,896,635 | A * | 7/1975 | Stewart | F25B 3/00 62/499 |
| 4,010,647 | A * | 3/1977 | Kissell | G01N 1/22 417/94 |
| 4,443,708 | A * | 4/1984 | Lapeyre | F03B 13/12 290/42 |
| 4,770,606 | A * | 9/1988 | Kuroiwa | F04D 17/122 415/199.1 |
| 4,820,134 | A * | 4/1989 | Karlsson | F04B 17/00 415/88 |
| 5,275,091 | A * | 1/1994 | McFarlane | A23B 7/005 415/73 |
| 5,366,341 | A * | 11/1994 | Marino | F03B 13/1815 415/3.1 |
| 5,556,765 | A * | 9/1996 | Dedolph | B01F 5/10 138/DIG. 11 |
| 6,355,988 | B1 * | 3/2002 | Maple | F03B 17/005 290/54 |
| 6,554,799 | B1 * | 4/2003 | Hatamura | A61F 11/004 29/889 |
| 6,612,804 | B2 * | 9/2003 | Su | F04D 17/02 415/73 |
| 7,299,628 | B2 * | 11/2007 | Buller | F03B 13/00 290/54 |
| 7,794,196 | B2 * | 9/2010 | Demontmorency | F03B 3/186 415/4.3 |
| 9,759,180 | B2 * | 9/2017 | Russo | F03B 13/264 |
| 2012/0117960 | A1 * | 5/2012 | Browne | F03B 13/183 60/495 |
| 2012/0242088 | A1 * | 9/2012 | Raz | F03B 17/061 290/55 |
| 2013/0115046 | A1 * | 5/2013 | Kao | F04D 3/02 415/73 |
| 2013/0134703 | A1 * | 5/2013 | Williams | F03B 17/061 285/124.1 |

FOREIGN PATENT DOCUMENTS

| | | |
|---|---|---|
| FR | 2454007 | 11/1980 |
| GB | 1422723 | 3/1976 |

* cited by examiner

PUMP DEVICE FOR CONVERTING ROTATION INTO FLUID FLOW

FIELD OF THE INVENTION

The present invention relates to an apparatus and method for converting rotation into fluid flow, and to an apparatus and method for converting fluid flow into rotation.

BACKGROUND OF THE INVENTION

It has long been known to pump water or compress air using a device relying on alternatingly admitting air and water into a coiled pipe, which is rotated around an axis of rotation. Such a device has few moving parts, and is considered to be relatively simple and reliable.

For instance, GB 1 427 723 discloses an apparatus for pumping fluids, which comprises a pipe of constant cross-section disposed around a cylindrical structure in a number of turns so as to form a cylindrically shaped coil. One end of the coiled pipe is connected to a hollow shaft of the apparatus, while the other end of the coiled pipe terminates at the periphery of the cylindrical structure and is open to the atmosphere. When the cylindrical structure is rotated, water and air are alternatingly admitted to the open end of the pipe and transported to the hollow shaft.

Although the apparatus according to GB 1 427 723 is capable of pumping water and compressing air, there appears to still be room for improvement. In particular, it would be desirable to provide a more energy-efficient apparatus for converting rotation into fluid flow and/or converting fluid flow into rotation.

SUMMARY

In view of above-mentioned and other drawbacks of the prior art, it is an object of the present invention to provide an improved apparatus for converting rotation into fluid flow and or converting fluid flow into rotation.

According to a first aspect of the present invention, it is therefore provided an apparatus for converting rotation into fluid flow, comprising: a first fluid conduit extending from a first open end to a second open end of the first fluid conduit, the first fluid conduit being coiled around a first axis of rotation; a second fluid conduit extending from a first open end to a second open end of the second fluid conduit, the second fluid conduit being coiled around a second axis of rotation; a rotor coupled to the first fluid conduit and to the second fluid conduit in such a way that rotation of the rotor causes the first fluid conduit to rotate around the first axis of rotation and the second fluid conduit to rotate around the second axis of rotation; a first fluid separator for separating the first fluid from a second fluid having a second density different from the first density, the first fluid separator being in fluid flow communication with the second open end of the first fluid conduit, and in fluid flow communication with the first open end of the second fluid conduit; and an outlet allowing extraction of the first fluid from the first fluid separator, wherein the first fluid separator is configured in such a way that when, during rotation of the rotor in a first direction of rotation, first mass portions of the first fluid and second mass portions of the second fluid are alternatingly transported from the first open end towards the second open end of the first fluid conduit, third mass portions of the first fluid and fourth mass portions of the second fluid are alternatingly transported from the first open end towards the second open end of the second fluid conduit, wherein a ratio between each of the first mass portions and each of the second mass portions is substantially greater than a ratio between each of the third mass portions and each of the fourth mass portions.

According to a second aspect of the present invention, it is provided a method of converting rotation into fluid flow using an apparatus comprising: a first fluid conduit extending from a first open end to a second open end of the first fluid conduit, the first fluid conduit being coiled around a first axis of rotation; a second fluid conduit extending from a first open end to a second open end of the second fluid conduit, the second fluid conduit being coiled around a second axis of rotation; and a first fluid separator for separating the first fluid from a second fluid having a second density different from the first density, the first fluid separator being in fluid flow communication with the second open end of the first fluid conduit, and in fluid flow communication with the first open end of the second fluid conduit, the method comprising the steps of: rotating the first fluid conduit around the first axis of rotation; rotating the second fluid conduit around the second axis of rotation; alternatingly providing a plurality of first mass portions of the first fluid and a plurality of second mass portions of the second fluid to the first open end of the first fluid conduit; alternatingly providing, from the fluid separator, a plurality of third mass portions of the first fluid and a plurality of fourth mass portions of a second fluid to the first end of the second pipe, wherein a ratio between each of the first mass portions and each of the second mass portions is substantially greater than a ratio between each of the third mass portions and each of the fourth mass portions; and extracting first fluid from the fluid separator.

According to a third aspect of the present invention, it is provided an apparatus for converting fluid flow into rotation, comprising: a first fluid conduit for accommodating transport of a first fluid and a second fluid different from the first fluid through the first fluid conduit, the first fluid conduit extending from a first open end to a second open end of the first fluid conduit, the first fluid conduit being coiled around a first axis of rotation; a second fluid conduit for accommodating transport of the first fluid and the second fluid through the second fluid conduit, the second fluid conduit extending from a first open end to a second open end of the second fluid conduit, the second fluid conduit being coiled around a second axis of rotation; a rotor coupled to the first fluid conduit and to the second fluid conduit in such a way that rotation of the rotor causes the first fluid conduit to rotate around the first axis of rotation and the second fluid conduit to rotate around the second axis of rotation; a first fluid separator for separating the first fluid from the second fluid, the first fluid separator being in fluid flow communication with the second open end of the first fluid conduit, and in fluid flow communication with the first open end of the second fluid conduit; and means for increasing pressure in the first fluid separator, wherein the first fluid separator is configured in such a way that when pressure is increased in the first fluid separator, the first and second fluids are displaced in the first fluid conduit and in the second fluid conduit to provide a net torque acting on the rotor, resulting in rotation of the rotor.

According to a fourth aspect of the present invention, it is provided a method of converting fluid flow into rotation using an apparatus comprising: a first fluid conduit for accommodating transport of a first fluid and a second fluid different from the first fluid through the first fluid conduit, the first fluid conduit extending from a first open end to a second open end of the first fluid conduit, the first fluid conduit being coiled around a first axis of rotation; a second fluid conduit for accommodating transport of the first fluid and the second fluid through the second fluid conduit, the second fluid conduit extending from a first open end to a second open end of the second fluid conduit, the second fluid conduit being coiled around a second axis of rotation; and a first fluid separator for separating the first fluid from the second fluid, the first fluid separator being in fluid flow communication with the second open end of the first fluid conduit, and in fluid flow communication with the first open end of the second fluid conduit the method comprising the steps of: configuring the first fluid separator in such a way that when pressure is increased in the first fluid separator, the first and second fluids are displaced in the first fluid conduit and in the second fluid conduit to provide a net torque acting on the rotor, resulting in rotation of the rotor; and increasing pressure in the first fluid separator. That a fluid conduit is coiled around an axis of rotation should be understood to mean that the fluid conduit is looped more than one revolution around the axis of rotation to form a coil. The coil may have any configuration, such as a spiral coil, a helical coil or any hybrid of a spiral coil and a helical coil. Accordingly, each fluid conduit may be coiled in such a way that the distance between the fluid conduit and its respective axis of rotation is different for different loops and different loops may be coiled around the axis of rotation at different positions along the axis of rotation.

By the term "rotor" should generally be understood a rotating member, that rotates in relation to a (relatively) stationary member.

A fluid is any substance that flows. Accordingly, fluids include, for example, gases, liquids, and, for instance, solid particles suspended in a liquid to form a particle suspension exhibiting fluid behavior.

That an open end of a fluid conduit is in fluid flow communication with a fluid separator should be understood to mean that fluid may pass between the fluid conduit and the fluid separator through the open end of the fluid conduit. The fluid flow may be substantially unrestricted, or the fluid flow may be actively controlled, for example using one or several valves.

One must keep in mind that a given mass portion of a fluid may have different volumes depending on, in particular, the pressure in the mass portion. In particular if the first fluid or the second fluid is a gas, a given mass portion may have a volume that depends strongly on the pressure (according to Boyle's law for an ideal gas).

The various aspects of the present invention are based on the same general inventive concept, viz. to use a first coiled fluid conduit for fluid transport towards or from a fluid separator and a second coiled fluid conduit for fluid transport away from or to a fluid separator, and configuring the fluid separator so that rotation of the coiled fluid conduits results in a flow of at least one of the first and second fluids towards or away from the fluid separator. In some embodiments, the flow of the first and/or second fluid towards or away from the fluid separator may be a net flow. This is the case for embodiments where the apparatus, for example, functions as a compressor, a liquid pump or a fluid driven motor. In other embodiments, the flow may be sustained by means of a heat gradient, or rotational energy may be converted to a heat gradient.

The present inventor has realized that using one coiled fluid conduit—a pressure-increasing fluid conduit—to achieve a gradual increase in pressure and one coiled fluid conduit—a pressure-decreasing fluid conduit—to achieve a gradual decrease in pressure provides for several important advantageous effects over previously known apparatuses.

When a first fluid and a second fluid having different densities are both present inside a coiled fluid conduit, the equilibrium state for the coiled fluid conduit, when stationary and having the same pressure at both open ends, will be with the combined center of mass of the first and second fluids directly below the axis of rotation for the coiled fluid conduit. When the coiled fluid conduit is rotated against a pressure head the combined center of mass shifts along the coiled fluid conduit corresponding to the gradually increased pressure inside the (pressure-increasing) coiled fluid conduit. The shifted combined center of mass in the pressure-increasing coiled fluid conduit will exert a torque on the coiled fluid conduit. A greater torque of opposite sign than this mass center shift induced torque will need to be provided to the pressure-increasing coiled fluid conduit to maintain rotation.

During rotation, pressurized mass portions of the first fluid and of the second fluid will alternatingly be provided from the pressure-increasing fluid conduit to the fluid separator.

Pressurized mass portions of the first fluid and the second fluid will also be alternatingly provided from the fluid separator to the pressure-decreasing fluid conduit. Also in the pressure-decreasing fluid conduit, there will be a shifted combined center of mass due to the pressure gradient from the inlet of the pressure-decreasing fluid conduit (at the fluid separator) to the outlet of the pressure-decreasing fluid conduit. However, instead of working against the rotation, the shifted combined center of mass in the pressure-decreasing fluid conduit will exert a torque that supports the rotation. Furthermore, the decrease in pressure takes place gradually along the pressure-decreasing coiled fluid conduit.

Both of these effects—the rotation-supporting shift in combined center of mass in the pressure-decreasing coiled fluid conduit and the gradual decrease in pressure—provide for more energy-efficient operation. The pressure reduction in the first and second fluids is used for supporting operation of the apparatus rather than being lost as friction and/or simply being released from the apparatus to its surroundings (as more or less uncontrolled release of pressurized fluid).

Furthermore, transporting first and second fluid towards the fluid separator using one coiled fluid conduit and transporting first and second fluid away from the fluid separator using another coiled fluid conduit provides for recirculation of at least the second fluid, which in turn provides for an apparatus that can operate without constant supply of the second fluid. This dramatically increases the usability of the apparatus according to various embodiments of the present invention, in particular when the first fluid is air.

Moreover, the configuration of the apparatus according to the different aspects of the present invention provides for energy-efficient use of the apparatus as a combined pump/compressor and motor, to allow the apparatus to, for instance, at times store energy in the form of potential energy and/or pressure and, at other times, convert such stored energy in the form of potential energy and/or pressure to rotation. The rotation may, for example, be used for generating electricity.

When the apparatus according to embodiments of the various aspects of the invention is used as a pump/compressor, the above-mentioned first fluid conduit will be the pressure-increasing fluid conduit, and when the apparatus is used as a motor driven by fluid flow into the first fluid separator, the above-mentioned first fluid conduit will be the pressure-decreasing fluid conduit. The rotation of the rotor may be opposite in the two modes of operation of the apparatus.

In this context, it should be noted that the above explanations and advantages apply equally well to all aspects of the present invention, that is, regardless of whether the apparatus is configured for converting rotation into fluid flow or for converting fluid flow into rotation.

Regarding the aspects of the present invention relating to converting rotation into fluid flow, it should be noted that, over a given time, the sum of the first mass portions and the second mass portions is greater than the sum of the third mass portions and the fourth mass portions, corresponding to a net flow of fluid into the first fluid separator when the rotor is rotated in the first direction. In particular there will be a net flow of first fluid into the first fluid separator, but in embodiments, there may also be a (smaller) net flow of second fluid into the first fluid separator. Such a net flow of second fluid may advantageously be used for heating or cooling the apparatus, which may in turn provide for even more energy efficient operation.

Regarding the aspects of the present invention relating to converting fluid flow into rotation, it should be noted that the desired displacement of the first and second fluids in the first fluid conduit and the second fluid conduit to provide a net torque acting on the rotor, may be achieved in several different ways. For example, the desired displacements can be achieved through the arrangement of the ends of the fluid conduits that are in fluid flow communication with the first fluid separator or through active control of the alternating supply of first fluid and second fluid to the first and second fluid conduits, for instance using one or more valves. In other words, the ends of the fluid conduits that are in fluid flow communication with the first fluid separator may be arranged in such a way that increased pressure in the first fluid separator results in different displacements of the mass portions of first and second fluid in the first and second fluid conduits, which in turn results in a net torque acting on the apparatus. Alternatively, the apparatus may comprise controllable valves and processing circuitry for controlling such valves to achieve the desired net torque and resulting rotation.

With the terminology used herein, the rotation resulting from the above-mentioned net torque acting on the rotor will take place in a second direction of rotation, opposite the above-mentioned first direction of rotation.

The means for increasing pressure in the first fluid separator may be any suitable means known to one of ordinary skill in the art. The pressure may be increased by increasing the amount of first and/or second fluid in the apparatus and/or by increasing the temperature in the first fluid separator. A temperature increase may be achieved by directly heating the first and/or second fluid in the first fluid separator and/or heating at least a portion of the first fluid conduit, which may result in even more energy-efficient operation.

To provide for sustained closed loop operation of the apparatus, that is, without supply of first fluid to the first fluid separator, the apparatus may advantageously first comprise cooling means for cooling the first and second fluid in the second fluid conduit. For instance, at least a portion of the second fluid conduit may be provided with a heat sink, such as a metal block with fins or similar.

It should be understood that the following description and explanations of different embodiments of the present invention apply to all aspects of the present invention.

The first and second fluids may be mutually immiscible. For instance, the first fluid may advantageously be a gas, such as air, and the second fluid may advantageously be a liquid, such as water.

According to various embodiments, the first and second axes of rotation may coincide and constitute a common axis of rotation.

Alternatively, the first and second axes of rotation may be different axes of rotation and gearing may be provided for coupling the rotor to the first and second fluid conduits in such a way that rotation of the rotor causes rotation of the first and second fluid conduits around different axes of rotation.

In embodiments with a common axis of rotation, the first fluid conduit may be coiled around the common axis of rotation in a first angular direction; and the second fluid conduit may be coiled around the common axis of rotation in a second angular direction opposite to the first angular direction.

According to various embodiments, furthermore, the fluid separator may comprise a first container coupled to the first fluid conduit and the second fluid conduit to rotate around the common axis of rotation together with the first fluid conduit and the second fluid conduit.

Due to the different densities of the first and second fluids, a fluid interface that stays substantially stationary during rotation can be formed in the first container. The substantially stationary fluid interface can be used to control the supply of first fluid and second fluid from the first container to the relevant coiled fluid conduit. As was explained above, the coiled fluid conduit being supplied with first fluid and second fluid from the first fluid separator will be the pressure-decreasing coiled fluid conduit.

As an alternative or complement to the first container, the fluid separation may take place using active fluid supply control means, such as one or several valves.

According to various embodiments, the second fluid conduit, starting from the first open end of the second fluid conduit, may be coiled at least a first revolution and a last revolution around the common axis of rotation; and the first revolution may be at a smaller radial distance from the common axis of rotation than the last revolution.

Analogously, the first fluid conduit, starting from the second open end of the first fluid conduit, may be coiled at least a first revolution and a last revolution around the common axis of rotation; and the first revolution may be at a smaller radial distance from the common axis of rotation than the last revolution.

In somewhat different terms, the average distance between the axis of rotation and the second fluid conduit may increase with increasing distance along the second fluid conduit from the first open end thereof.

Analogously, the average distance between the axis of rotation and the first fluid conduit may increase with increasing distance along the first fluid conduit from the second open end thereof.

In particular, the radial distance between the first/second coiled fluid conduit and the common axis of rotation may increase monotonously from the open end of the first/second coiled fluid conduit that is in fluid flow communication with the first fluid separator.

This may be especially advantageous in embodiments where one or both of the first and second fluids is a gas. In such embodiments, each mass portion of the gas(es) may exhibit a considerably larger volume on the low-pressure side of each coiled fluid conduit than on the high-pressure side thereof (close to the first fluid separator). Since each loop of the coiled fluid conduits should contain only one mass portion of the first fluid and only one mass portion of the second fluid, the loops may preferably gradually get bigger with decreasing pressure inside the fluid conduits. Alternatively or in combination, the volume per unit length of the first and/or the second coiled fluid conduit may vary along the length thereof (smaller volume per unit length closer to the first fluid separator).

In various embodiments, to achieve the desired relation between mass portions of the first and second fluids passing through the first and second coiled fluid conduits respectively, the second open end of the first fluid conduit may be fluid flow connected to the first fluid separator at a first connection location and the first open end of the second fluid conduit may be fluid flow connected to the first fluid separator at a second connection location, wherein, when the apparatus is in operation: the common axis of rotation forms an angle in relation to a horizontal plane; the first connection location rotates around the common axis of rotation centered at a first vertical position along the common axis of rotation; and the second connection location rotates around the common axis of rotation centered at a second vertical position along the common axis of rotation, the first vertical position being higher than the second vertical position.

According to various embodiments of the present invention, the apparatus may advantageously further comprise at least one interconnecting conduit having a first end and a second end, wherein the first end of the interconnecting conduit is in fluid flow connection with the first fluid conduit and the second end of the interconnecting conduit is in fluid flow connection with the second fluid conduit to allow fluid flow between the first fluid conduit and the second fluid conduit.

The first end of the interconnecting conduit may be connected to the first fluid conduit at a connection location between the first and second ends of the first fluid conduit; and the second end of the interconnecting conduit may be connected to the second fluid conduit at a connection location between the first and second ends of the second fluid conduit.

Moreover, the apparatus may comprise a plurality of interconnecting conduits fluid flow connecting the first and second fluid conduits between different connection locations.

Through the provision of one or several interconnecting conduit(s), the effect of fluid compression can be compensated for along the first and second fluid conduits, allowing for a larger pressure gradient between beginning and end of the first and second fluid conduits, respectively. In the case of the first fluid being a gas, and the second fluid being a liquid, fluid can be transported from the first fluid conduit to the second fluid conduit using the interconnecting fluid conduit(s). Hereby, the volume ratio between liquid and gas can be kept sufficiently low along the first fluid conduit to allow further compression of the gas. In these embodiments, the apparatus—either for conversion of rotation to fluid flow or for conversion of fluid flow to rotation—can be made even more efficient and compact.

According to some embodiments, the apparatus of the various aspects of the present invention may further comprise an electric motor/generator including the rotor.

The term "electric motor/generator" should be understand to include a device designed for alternating between functioning as an electric motor and as an electric generator, as well as a dedicated electric motor or a dedicated electric generator.

According to other embodiments, the rotor may be configured to be rotated by the first or second fluid flowing past the rotor. In these embodiments, electricity need not necessarily be involved, but the rotation of the rotor may be used for, for instance, pumping a liquid and/or compressing a gas. For example, the flowing water of a river may be used for rotating the rotor, which in turn results in the first and second coiled fluid conduits rotating to transport the above-mentioned first fluid, which may in this case be water or air.

According to various embodiments, furthermore, the apparatus may be arrangeable at an interface between the first fluid and the second fluid in such a way that when the rotor rotates in the first direction of rotation, first fluid and second fluid are alternatingly supplied to the first open end of the first fluid conduit.

Particularly, the first fluid may be air and the second fluid may be water, and the apparatus may be structured to float in water in such a way that, when the rotor rotates in the first direction of rotation, the first open end of the first fluid conduit is alternatingly in the air and alternately in the water.

The apparatus may be structured to float in water with a suitable buoyancy and orientation in various ways within the reach of the skilled person, without undue burden. For instance, the first and/or second fluid conduits may be made in a material having a suitable density and/or density distribution. Alternatively, or in combination, the first and second fluid conduits may be coupled to a buoyancy member, which may have a controllable buoyancy so that the position in the water of the apparatus can be controlled by controlling the buoyancy of the buoyancy member.

According to other embodiments, the apparatus may further comprise a second fluid separator for separating the first fluid from the second fluid, the second fluid separator being in fluid flow communication with the first open end of the first fluid conduit, and in fluid flow communication with the second open end of the second fluid conduit.

These embodiments provide for recycling of at least the second fluid so that continuous supply of the second fluid is not needed for operation of the apparatus.

In embodiments where the apparatus is used for achieving a net transport of first fluid from the second fluid separator to the first fluid separator, the second fluid separator may be configured in such a way that when the rotor rotates in the first direction of rotation, the first mass portions of the first fluid and the second mass portions of the second fluid are alternately injected into the first open end of the first fluid conduit.

In various embodiments where the first and second axes of rotation are constituted by a common axis of rotation, the second fluid separator may comprise a second container coupled to the first fluid conduit and the second fluid conduit to rotate around the common axis of rotation together with the first fluid conduit and the second fluid conduit.

In these embodiments, the first open end of the first fluid conduit may advantageously be fluid flow connected to the second container at a first connection location and the second open end of the second fluid conduit may be fluid flow connected to the second container at a second connection location, wherein, when the apparatus is in operation: the common axis of rotation forms an angle in relation to a horizontal plane; the first connection location rotates around the common axis of rotation centered at a first vertical position along the common axis of rotation; and the second connection location rotates around the common axis of rotation centered at a second vertical position along the common axis of rotation, the first vertical position being higher than the second vertical position.

According to various embodiments of the present invention, there is further provided a multi-stage apparatus including a first apparatus comprising a first fluid separator and a second fluid separator; and a second apparatus comprising a first fluid separator and a second fluid separator, wherein the first fluid separator comprised in the first apparatus constitutes the second fluid separator comprised in the second apparatus.

By coupling pressure-increasing/pressure-decreasing stages in series in this manner, fluid pressure can be increased more than in a one-stage apparatus given the same dimensions. Conversely, a given pressure can be obtained with smaller dimensions than for a one-stage apparatus.

Furthermore, if one of the first and second fluids is a gas, the fluid separator between consecutive stages can be used for "resetting" the ratio between mass portions of gas and liquid while maintaining the pressure at that fluid separator. This provides for compression of gas, for example air, to a high pressure in a very energy-efficient and silent manner, and with few moving parts.

Generally, compared to conventional pumps or compressor, the apparatus according to various embodiments of the present invention allows for considerably more energy-efficient and reliable operation. For instance, the temperature gradients in the apparatus can be made very small, as the heat generated when compressing a gas, such as air, can be absorbed by the liquid, such as water, gradually and over a very large heat transfer area. Water also has a high heat capacity. Moreover, the only sound from the apparatus according to embodiments of the present invention will be from fluid flowing through the fluid conduits, which will make the apparatus considerably less noisy than conventional pumps or compressors. Moreover, very few moving parts are required, providing for easy maintenance.

In summary, according to various embodiments the present invention relates to an apparatus for converting rotation into fluid flow and/or fluid flow into rotation. The apparatus comprises a first coiled fluid conduit and a second coiled fluid conduit and a fluid separator for separating a first fluid from a second fluid having a second density different from the first density. The fluid separator is configured in such a way that when, during rotation of the fluid conduits first mass portions of the first fluid and second mass portions of the second fluid are alternatingly transported by the first fluid conduit into the fluid separator, third mass portions of the first fluid and fourth mass portions of the second fluid are alternatingly transported from the fluid separator by the second fluid conduit. A ratio between each of the first mass portions and each of the second mass portions is substantially greater than a ratio between each of the third mass portions and each of the fourth mass portions. This provides for a net flow of one of the first and second fluids through the apparatus.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the apparatus and method according to the present invention are mainly described with reference to apparatuses for converting rotation into fluid flow and/or converting fluid flow into rotation, having at least a first fluid conduit and a second fluid conduit coiled around a common axis of rotation. Furthermore, an embodiment is described with several pressure stages arranged along the common axis of rotation. Moreover, the described embodiments are described as operating using water and air.

It should be noted that this by no means limits the scope of the present invention, which equally well includes, for example, apparatuses in which first fluid conduit(s) and the second fluid conduit(s) are coiled around different axes of rotation, as long as the fluid conduits are suitably coupled to the rotor. Furthermore, apparatuses with several pressure stages need not have a sequence of fluid separators arranged along the axis of rotation, but may have several fluid separators arranged, for instance, in parallel with the axis of rotation, as long as the first fluid conduits and the second fluid conduits of each pressure stage are correctly fluid flow connected to the different fluid separators. Moreover, apparatuses according to embodiments of the present invention may operate using other combinations of first and second fluids having different densities. Operation with more than two different fluids is also foreseen.

Figure 1:
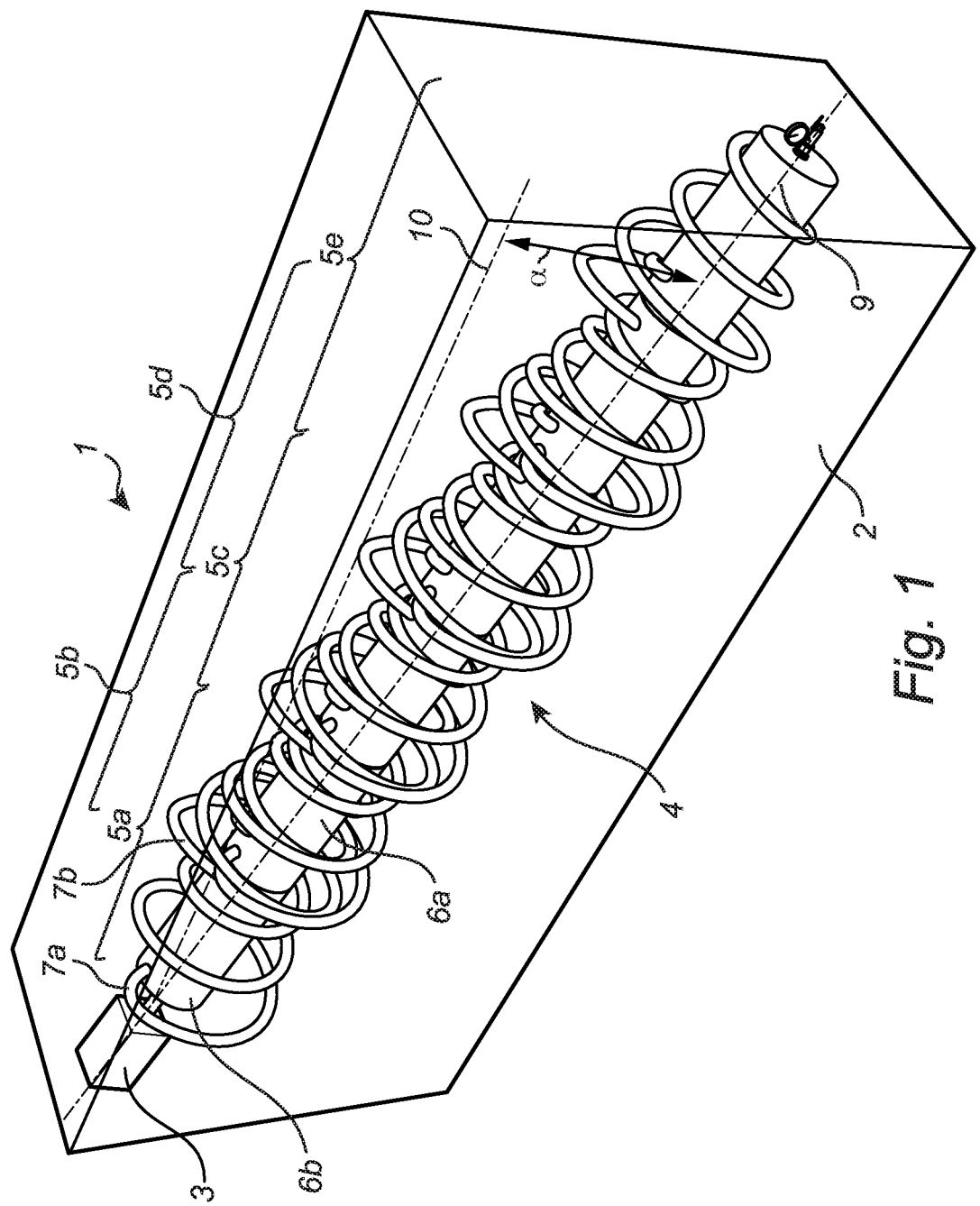
FIG. 1 is a schematic perspective view of an apparatus according to a first embodiment of the present invention, in the form of a free-standing compressor/air motor.

FIG. 1 schematically illustrates an apparatus according to a first embodiment of the present invention, in the form of a free-standing compressor/air motor 1. The compressor/air motor 1 is an apparatus that can operate in two modes of operation: a first mode in which rotation is converted to fluid (air) flow; and a second mode in which flow of pressurized fluid (air) is converted to rotation. Both these modes of operation will be described in detail further below.

The compressor/air motor 1 comprises a housing 2, an electrical motor/generator 3, and a multi-stage apparatus 4 for converting rotation into fluid flow in the above-mentioned first mode of operation and converting fluid flow into rotation in the above-mentioned second mode of operation.

The multi-stage apparatus 4 comprises a plurality of pressure stages 5a-e. Each of the pressure stages is an apparatus according to embodiments of the present invention, and includes (referring to the pressure stage 5a closest to the motor/generator 3 in FIG. 1) a first fluid separator 6a, a second fluid separator 6b, a first fluid conduit 7a, and a second fluid conduit 7b. The first fluid separator 6a of the pressure stage 5a closest to the motor/generator constitutes the second fluid separator of the pressure stage 5b second closest to the motor/generator 3 etc.

In the embodiment illustrated in FIG. 1, the fluid separators are arranged in-line along a common axis of rotation 9, and each of the fluid conduits of the different pressure stages 5a-e are coiled around the common axis of rotation 9. As seen from the motor/generator 3 in a direction along the axis of rotation 9, the first fluid conduit 7a of each pressure stage 5a-e is coiled clock-wise around the common axis of rotation 9, and the second fluid conduit 7b of each pressure stage 5a-e is coiled counter clock-wise around the common axis of rotation 9.

The common axis of rotation is, furthermore, inclined with respect to a horizontal line 10, as indicated by the inclination angle α in FIG. 1.

Operation of the compressor/air motor 1 in FIG. 1 in its first mode of operation (as a compressor) will now be described in greater detail with reference to FIG. 2, FIGS. 3a-d, and FIGS. 4a-b.

When the apparatus 1 in FIG. 1 is in its first mode of operation, the motor/generator 3 will function as an electric motor, and will therefore, in connection with the description of the first mode of operation, be referred to as an electric motor 3.

Figure 2:
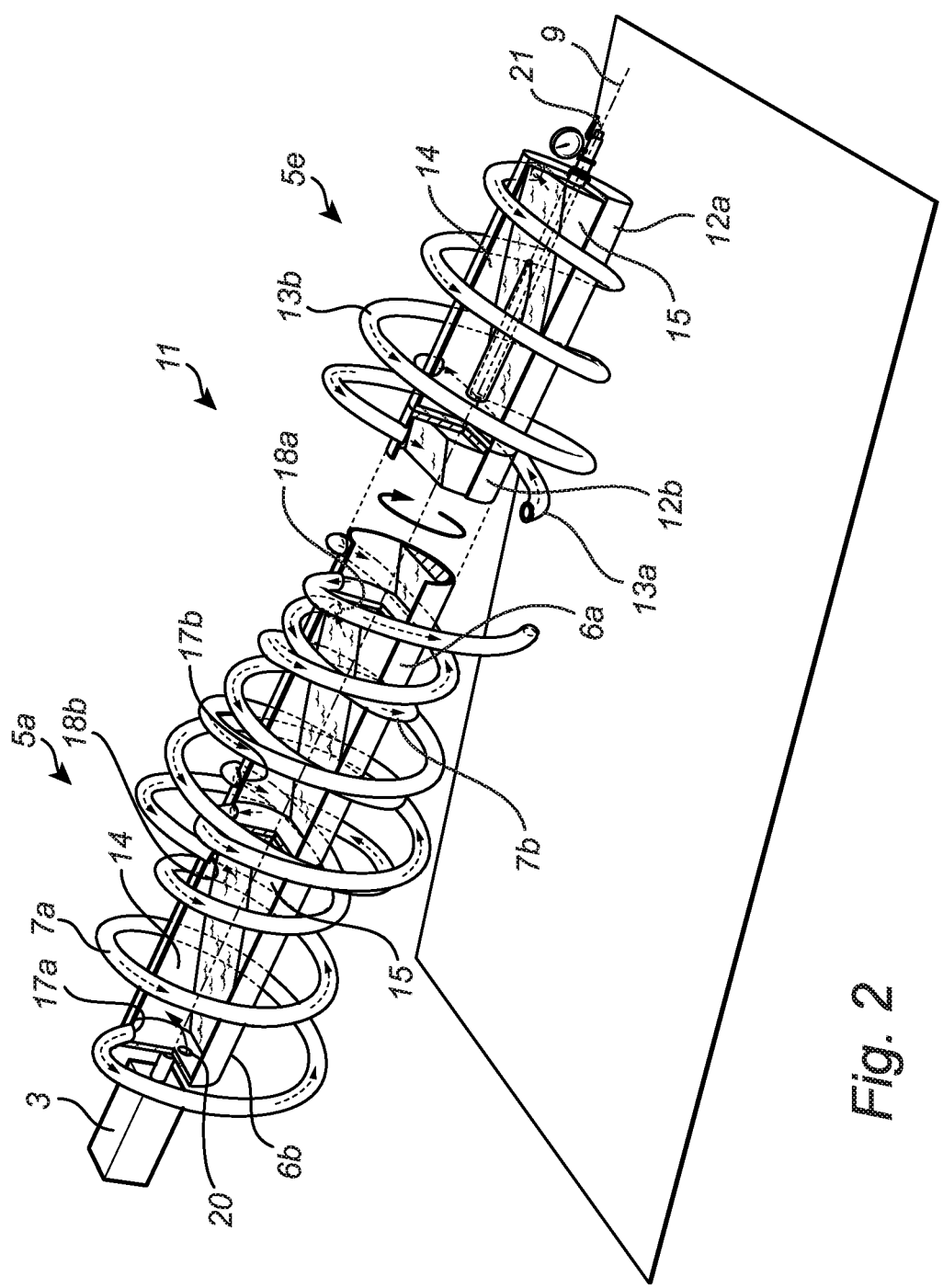
FIG. 2 is a partly cut-out view illustrating operation of the apparatus in FIG. 1 as a compressor.

FIG. 2 is a partly cut-out view illustrating operation of the apparatus in FIG. 1 as a compressor 11, with particular focus on the pressure stage 5a closest to the electric motor 3, and the pressure stage 5e farthest away from the electric motor 3. As is indicated in FIG. 2, this latter pressure stage 5e comprises a first fluid separator 12a, a second fluid separator 12b, a first fluid conduit 13a and a second fluid conduit 13b.

As is schematically shown in FIG. 2, each of the fluid separators 6a-b, 12a-b contains a first fluid (air) 14 and a second fluid (water) 15. Due to the inclination of the common axis of rotation 9 and the density difference between air 14 and water 15, the level of the interface between air 14 and water 15, in relation to the common axis of rotation 9, will vary in each fluid separator along the axis of rotation 9.

In the first mode of operation schematically illustrated in FIG. 2, when the electric motor 3 is controlled to rotate the pressure stages 5a-e counter clock-wise as seen from the electric motor 3, water and air will be transported from left to right in FIG. 2 by the first fluid conduit 7a, 13a of each pressure stage, and from right to left in FIG. 2 by the second fluid conduit 7b, 13b of each pressure stage.

To aid the description, the fluid transport properties of the first and second fluid conduits of each pressure stage will be described with reference to the first 7a and second 7b fluid conduits of the pressure stage 5a closest to the electric motor 3 (also referred to as the first stage of the compressor 11).

The first fluid conduit 7a has a first open end 17a in fluid flow communication with the second fluid separator 6b of the first stage 5a of the compressor 11, and a second open end 17b in fluid flow communication with the first fluid separator 6a of the first stage 5a of the compressor 11.

The second fluid conduit 7b has a first open end 18a in fluid flow communication with the first fluid separator 6a, and a second open end 18b in fluid flow communication with the second fluid separator 6b.

The ratio between first mass portions of air 14 and second mass portions of water 15 transported through the first fluid conduit 7a, from the second fluid separator 6b to the first fluid separator 6a, is determined by the position in the second fluid separator 6b, of the first open end 17a of the first fluid conduit 7a.

Regarding the second fluid conduit 7b, the ratio between third mass portions of air 14 and fourth mass portions of water 15 transported through the second fluid conduit 7b, from the first fluid separator 6a to the second fluid separator 6b, is determined by the position in the first fluid separator 6a, of the first open end 18a of the second fluid conduit 7b.

As is schematically indicated in FIG. 2, the first open end 17a of the first fluid conduit 7a is fluid flow connected to the second fluid separator 6b at a position along the axis of rotation 9 where the interface between air 14 and water 15 is at a first level in relation to a plane defined by the axis of rotation and a horizontal line. The first open end 18a of the second fluid conduit 7b is fluid flow connected to the first fluid separator 6a at a position along the axis of rotation 9 where the interface between air 14 and water 15 is at a second level in relation to the above-mentioned plane. The second level is higher (more water and less air in a cross-section of the fluid separator perpendicular to the axis of rotation 9) than the first level.

As a consequence, the ratio between each of the above-mentioned first mass portions (of air) and each of the above-mentioned second mass portions (of water) will be greater than the ratio between each of the above-mentioned third mass portions (of air) and each of the above-mentioned fourth mass portions (of water), providing for a net flow of air from left to right through the first pressure stage 5a. The following pressure stages 5b-e are configured in largely the same way as the first pressure stage 5a, to provide for a net transport of air from the air inlet 20 through the pressure stages 5a-e to the air outlet 21.

The pressure in the compressor 11 will successively increase from atmospheric pressure (about 1 bar) in the second fluid separator 6b of the first stage 5a of the compressor 11 to a higher pressure, such as up to 32 bar or more in the first fluid separator 12a of the last stage 5e of the compressor 11. Additional stages will provide for an even higher air pressure at the outlet 21. The decreasing coil diameter of each of the fluid conduits from the low pressure side of the compressor 11 towards the high pressure side of the compressor 11 is to take into account the decrease in air volume with increased pressure, and will be elaborated in more detail below with reference to FIGS. 3a-d.

To provide for a compact compressor 11, it is advantageous to configure the fluid flow connection between the first open end 17a of the first fluid conduit 7a and the second fluid separator 6b in such a way that the desired increase of pressure from the first open end 17a to the second open end 17b of the first fluid conduit 7a starts as early as possible. In particular, a portion of the first fluid conduit 7a adjacent to its first open end 17a may be configured to achieve a pressure increasing water column already in the first revolution of the coil around the axis of rotation 9. This will be described in greater detail below with reference to FIGS. 3a-d.

In FIGS. 3a-d, which are side views as seen from the electric motor 3 along the axis of rotation of the apparatus in FIG. 2 schematically showing the first (pressure-increasing) conduit 7a of the first stage 5a of the compressor for different rotational positions, the first mass portions of air 14 and second mass portions of water 15 are shown to propagate from the first open end 17a to the second open end 17b of the first fluid conduit 7a when the compressor 11 is in steady state operation. In FIGS. 3a-d, the electric motor 3 and the side wall of the second fluid separator 6b have been removed to be able to illustrate the interface between air 14 and water 15 inside the second fluid separator 6b. The air inlet 20 (in the side wall of the second fluid separator 6b), as well as the water level 24, in relation to the axis of rotation 9, in the first fluid separator 6a have been schematically indicated using dashed lines. It should be kept in mind that the first open end 17a of the first fluid conduit 7a is fluid flow connected to the second fluid separator 6b, while the second open end 17b of the first fluid conduit 7a is fluid flow connected to the first fluid separator 6a. As is indicated by the block arrow 25 in FIGS. 3a-d, the first fluid conduit 7a (as well as the first 6a and second 6b fluid separators) rotates counter clock-wise around the axis of rotation 9 as seen from the electric motor 3 along the axis of rotation 9 in FIG. 2.

Figure 3A:
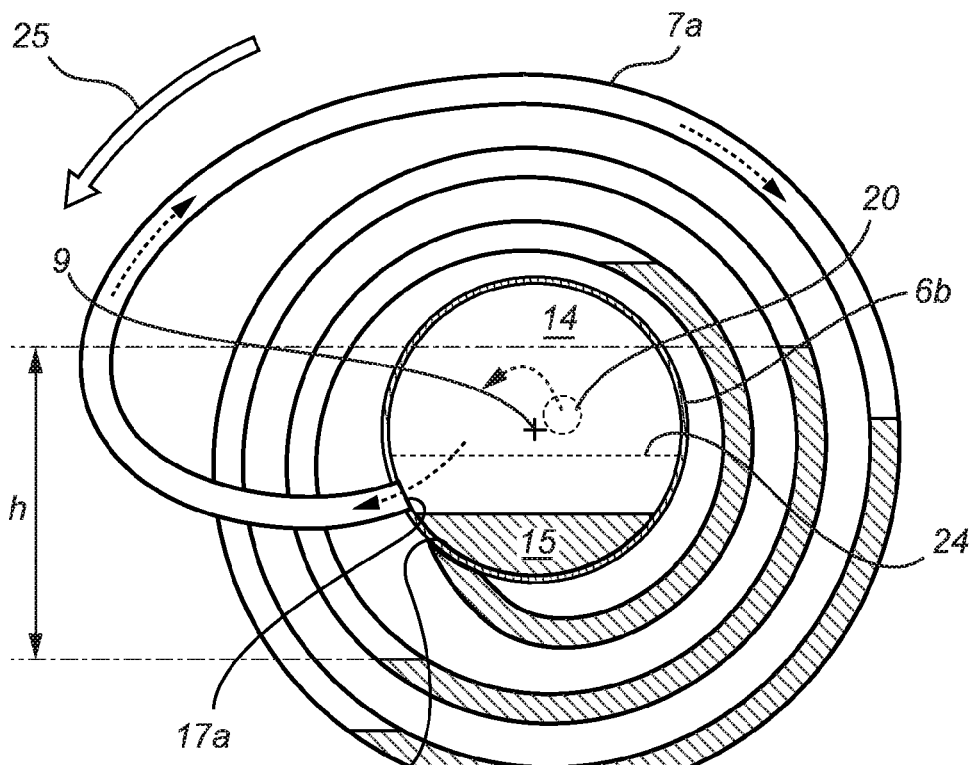
FIGS. 3a-d are side views as seen along the common axis of rotation of the apparatus in FIG. 2 schematically showing the pressure-increasing conduit of the first stage of the compressor for different angular positions.

In FIG. 3a, a first rotational position is shown, in which air 14 is still introduced into the first open end 17a of the first fluid conduit 7a, but water 15 is just about to enter into the first open end 17a following continued counter clock-wise rotation of the first fluid conduit 7a.

As was mentioned further above, there is a pressure difference between the pressure in the first fluid separator 6a and the pressure in the second fluid separator 6b. The pressure in the first fluid separator 6a is higher than the pressure in the second fluid separator 6b. This is reflected in FIGS. 3a-d by the water columns in each loop of the coiled first conduit 7a. Each loop forms substantially the same water column (indicated by 'h' in FIG. 3a), and each loop holds substantially the same volume of water (indicated by the hatched portion in each loop), while the volume of air decreases with increasing pressure (closer to the first fluid separator 6a). To allow the formation of the desired water column even though the increased pressure results in the air being compressed, the coils (which may alternatively be referred to as loops or revolutions) or the first fluid conduit 7a exhibit decreasing radial distances from the axis of rotation 9 towards the first fluid separator 6a, as is schematically indicated in FIGS. 3a-d as well as in FIG. 2. Alternatively, the radial distance between the coils and the axis of rotation could be substantially constant and the compression of the air could be compensated for by adjusting the inner cross-sectional area of the first fluid conduit 7a. Of course, a hybrid solution with decreasing radial distance in combination with a decreasing cross-sectional area would also be feasible.

Figure 3B:
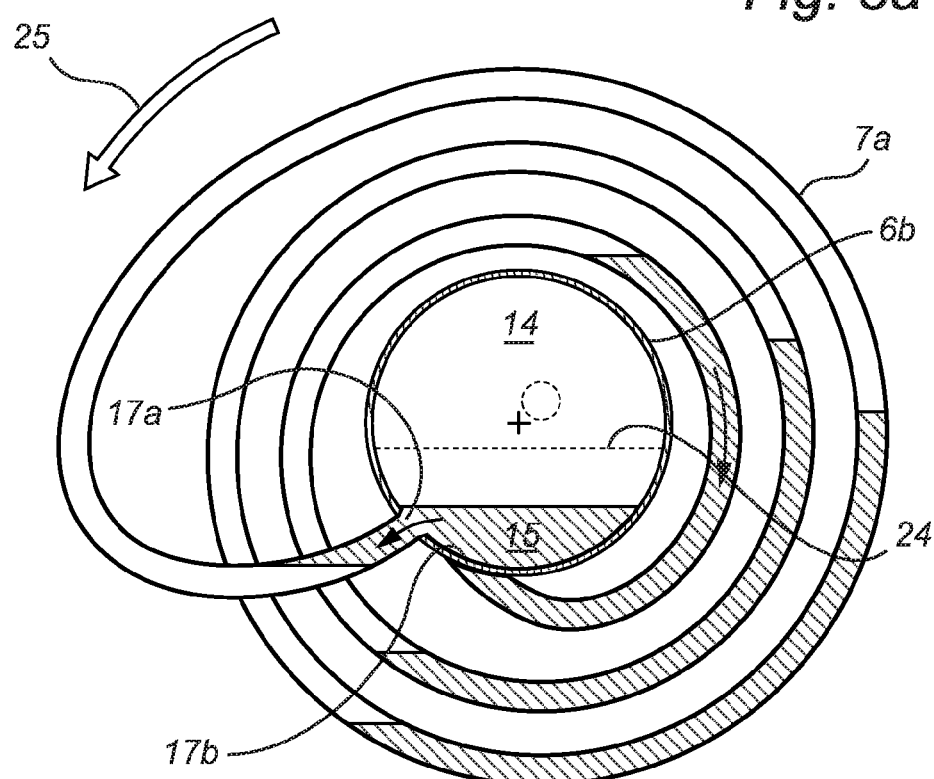

Turning to FIG. 3b, some additional rotation has taken place and, as is schematically indicated in FIG. 3b, water has started to be introduced into the first open end 17a of the first fluid conduit 7a. It should be noted that, just as in FIG. 3a, water flows from the second open end 17b of the first fluid conduit 7a into the first fluid separator 6a. In particular, the portion of the first fluid conduit 7a adjacent to the second open end 17b thereof is configured to introduce water into the first fluid separator 6a while the second open end 17b is below the water level in the first fluid separator 6a, and introduce air into the first fluid separator 6a while the second open end 17b is above the water level. This provides for a high energy efficiency of the compressor 11. No energy is wasted on bubbling air through the water or allowing water to only fall from a relatively high vertical level.

In this context, it should be noted that first mass portions of air 14 and second mass portions of water 15 enter the first open end 17a and exit the second open end 17b of the first fluid conduit 7a. However, the volume of the first mass portions is considerably smaller at the first fluid separator 6a, while the volume of the second mass portions remains substantially unchanged. Therefore, the second end 17b should be fluid flow connected to the first fluid separator 6a at a higher water level, in relation to the axis of rotation 9, than the water level in the second fluid separator 6b where the first open end 17a is fluid flow connected.

Figure 3C:
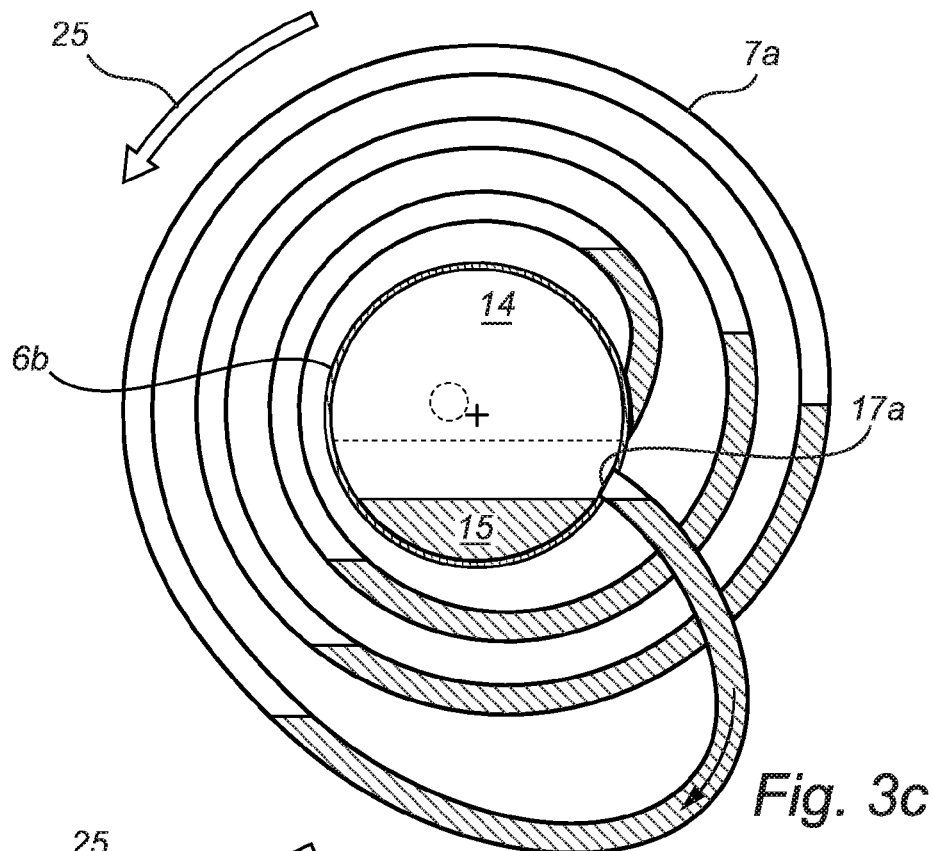

In FIG. 3c, the first open end 17a has rotated past the interface between air 14 and water 15 in the second fluid separator 6b, and a desired mass portion of water has been introduced into the first fluid conduit 7a. In the illustrated embodiment, the initial portion 26 of the first fluid conduit 7a adjacent to the first open end 17a has been configured to accommodate a sufficient length of the water portions ('slugs') in the fluid conduit while at the same time achieving the desired water column h. To that end, the length of the initial portion 26 should roughly be adapted to the mean diameter (or radius) D, roughly indicated in FIG. 3d, of the first fluid conduit 7a, the diameter (or radius) d of the second fluid separator 6b and the level of the air/water interface in the second fluid separator.

Figure 3D:
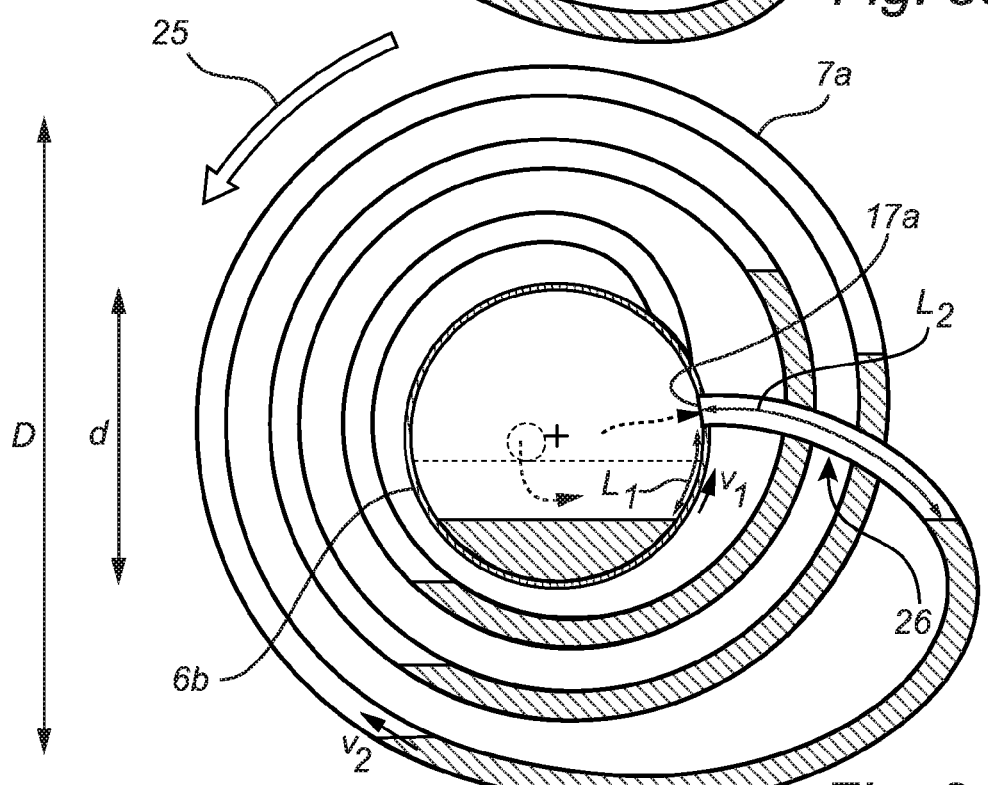

Consider, for example, the situation in FIG. 3d, where sufficient rotation has occurred to just establish the water column in the first (closest to the first open end 17a) coil of the first fluid conduit 7a. Here, the first open end 17a has moved a first distance $L_1$ from the air/water interface. This distance has been covered in a time duration t. In the same time duration t, the water inside the first coil of the first fluid conduit 7a has moved a second distance $L_2$.

The speed $v_1$ of the movement of the first open end 17a in relation to the air/water interface in the second fluid separator 6b is proportional to the inner diameter d and the angular speed of the rotation of the second fluid separator 6b. The speed $v_2$ of the water inside the first coil of the first fluid conduit 7a is the same as the speed of the fluid conduit, but in the opposite direction, and is thus proportional to the mean diameter D of the first fluid conduit 7a and the angular speed.

Since the angular speed is the same at the first open end 17a as at the periphery of the first coil, the second distance $L_2$ thus at least approximately relates to the first distance $L_1$ according to the following:

$$L_2 \approx L_1 \times D/d$$

This relation can be used to configure the first portion 26 of the first fluid conduit 7a to achieve a desired water column h for a given radial dimension of the first coil and water level in the second fluid separator at the position where the first open end 17a is fluid flow connected to the second fluid separator 6b.

So far, the description has focused on the first fluid conduits 7a working to transport water and air from the low pressure side of the compressor 11 towards the high pressure side of the compressor 11. In the first fluid conduits 7a, the rotation provided by the electric motor 3 is transformed into increased pressure. As described further above, this increased pressure relates to the water columns formed in each loop of the first fluid conduits 7a, as is schematically indicated by the hatched regions in FIG. 4a.

Figure 4A:
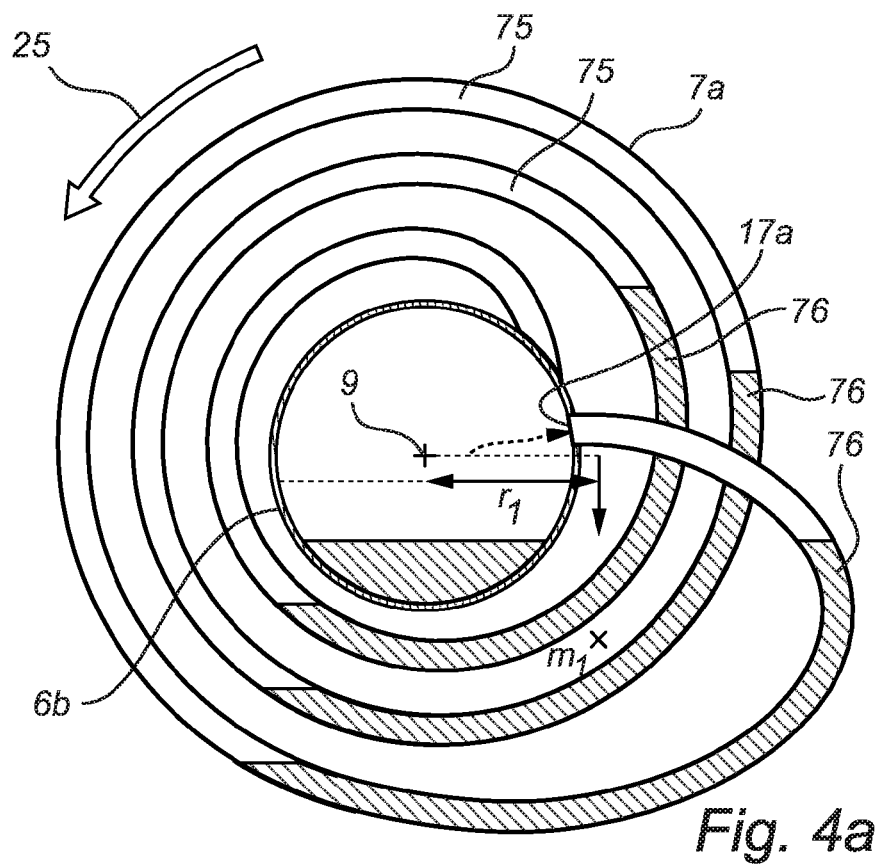
FIGS. 4a-b are side views of the apparatus in FIG. 2 schematically showing the pressure-increasing conduit and the pressure decreasing conduit of the first stage of the compressor.
Figure 4B:
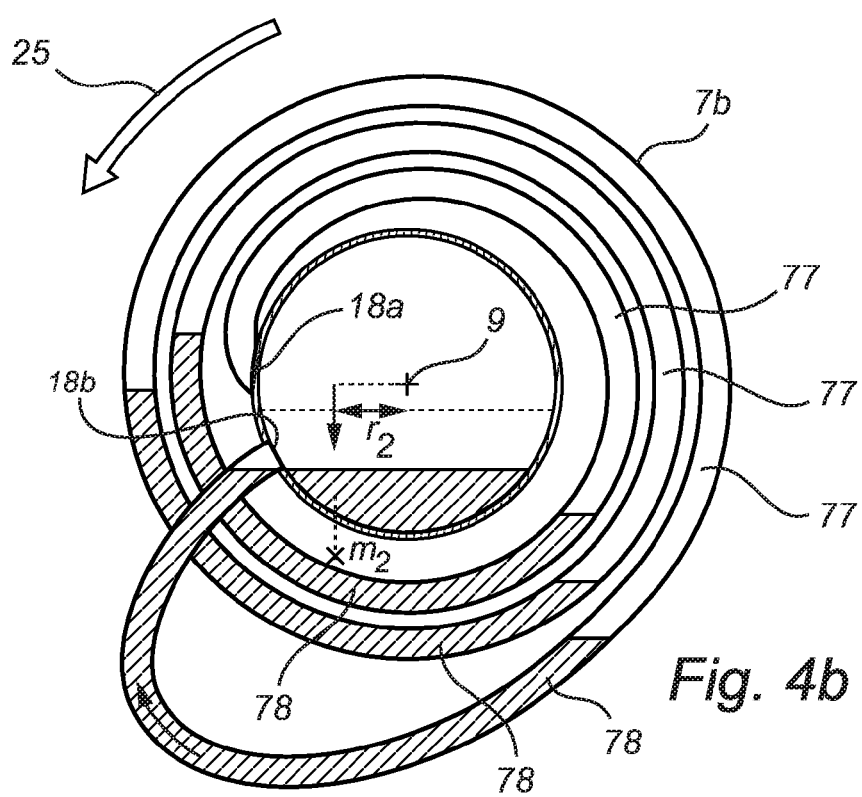

FIGS. 4a-b are side views of the apparatus in FIG. 2 schematically showing the pressure-increasing first fluid conduit 7a and the pressure decreasing second fluid conduit 7b of the first stage of the compressor as seen from the electric motor 3 along the axis of rotation 9.

As is schematically indicated in FIG. 4a, the first fluid conduit 7a transports first mass portions 75 of air and second mass portions 76 of water from the second fluid separator 6b to the first fluid separator 6a, and as is shown in FIG. 4b, the second fluid conduit 7b transports third mass portions 77 of air and fourth mass portions 78 of water from the first fluid separator 6a to the second fluid separator 6b.

The displaced water in the first fluid conduits 7a results in a shift of the center of mass of the first fluid conduits 7a, schematically indicated by m1 in FIG. 4a. The displacement of the center of mass $m_1$ of the first fluid conduits 7a results in a first displacement torque $T_1$ working clock-wise in FIG. 4a and having the magnitude $T_1=m_1r_1$. If there were no second fluid conduits 7b, the electric motor 3 would thus have to provide a torque working counter clock-wise and having a magnitude greater than $T_1$.

However, as will now be explained with reference to FIG. 4b, the displacement of the water in the second fluid conduits 7b will result in a second displacement torque $T_2$ working counter clock-wise in FIG. 4b. As is schematically indicated in FIG. 4b, the second displacement torque $T_2$ will have the magnitude $T_2=m_2r_2$. Since, in this embodiment, the mass of water in the first fluid conduits will be substantially the same as the mass of water in the second fluid conduits, and $r_1>r_2$, it follows that the magnitude $T_1$ of the first displacement torque $T_1$ will be greater than the magnitude $T_2$ of the second displacement torque $T_2$.

This means that the torque provided by the electric motor will only need to have a magnitude exceeding $T_1=T_2$, which provides for efficient operation of the compressor 11.

Operation of the compressor/air motor 1 in FIG. 1 in its second mode of operation (as an air motor) will now be described in greater detail with reference to FIG. 5.

When the apparatus 1 in FIG. 1 is in its second mode of operation, the motor/generator 3 will function as a generator, and will therefore, in connection with the description of the first mode of operation, be referred to as a generator 3.

Figure 5:
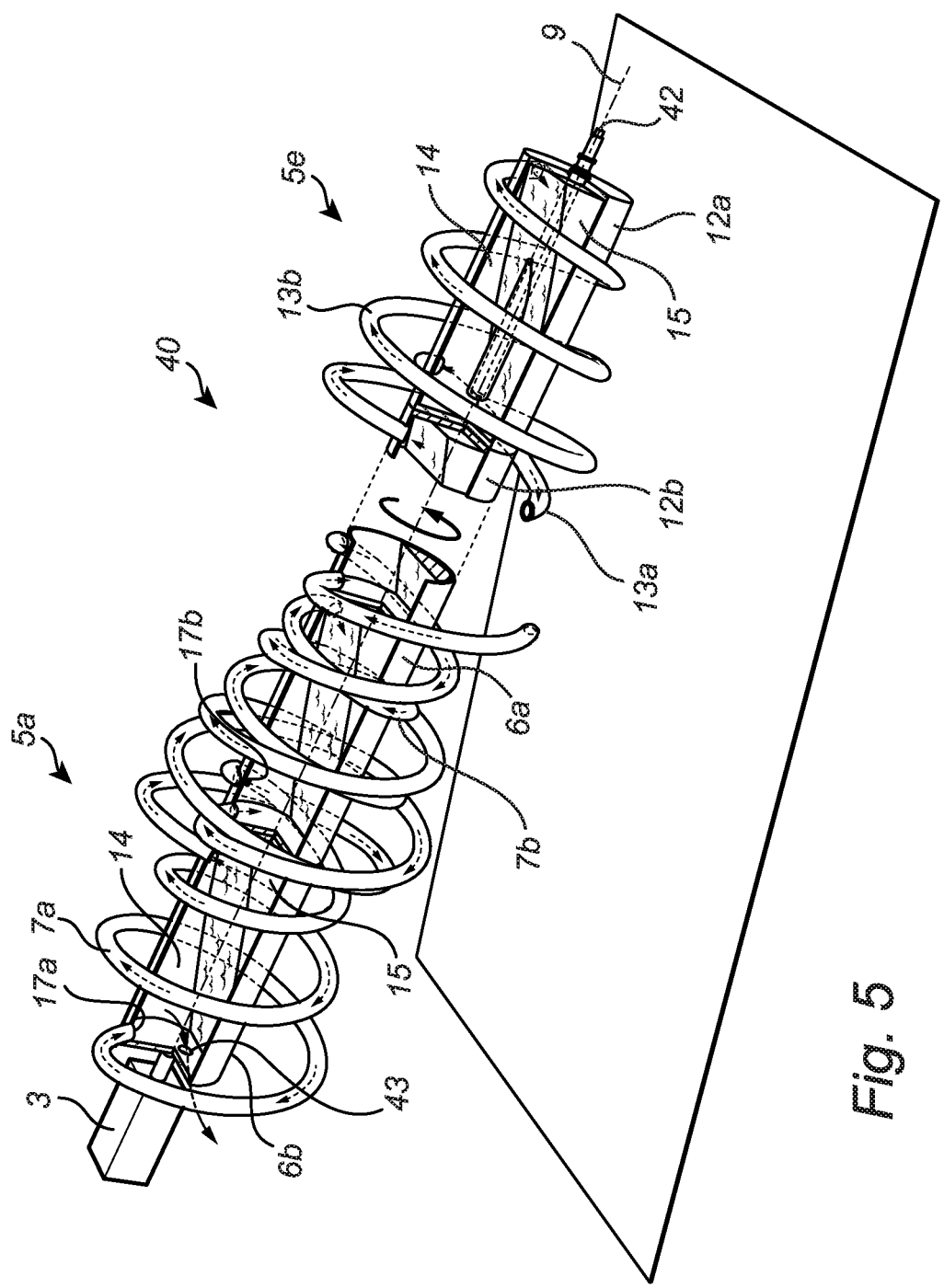
FIG. 5 is a partly cut-out view illustrating operation of the apparatus in FIG. 1 as a motor.

FIG. 5 is a partly cut-out view illustrating operation of the apparatus in FIG. 1 as an air motor 40. The difference between the compressor 11 in FIG. 2 and the air motor 40 in FIG. 5 is only that instead of producing pressurized air by means of rotation, rotation is produced using pressurized air.

When introducing pressurized air through the nozzle 42 provided on the high-pressure side of the air motor 40 (to the right in FIG. 5), the pressure difference will result in formation of water columns in the first and second fluid conduits of each pressure stage 5a-e as described above with reference to FIGS. 3a-d. The water columns will result in a shift in the center of mass in each coil of the fluid conduits of the air motor 40. The resulting torque will lead to rotation of the air motor 40 around the axis of rotation 9 as is indicated in FIG. 5. It should be noted that the flow of air and water through each fluid conduit will be in the opposite direction as compared to the first mode of operation (as a compressor 11) described further above. After having passed through the pressure stages 5a-e, the excess air will exit the air motor through outlet 43.

To facilitate the formation of the desired water columns when pressurized air is introduced through the nozzle 42, the first and second fluid conduits may be configured to provide for an initial phase shift of the water columns in the coils of the fluid conduits. This may, for instance, be achieved by configuring the initial portions, as seen from the high-pressure side, of the fluid conduits using the same principle described above in connection with FIG. 3d.

Figure 6:
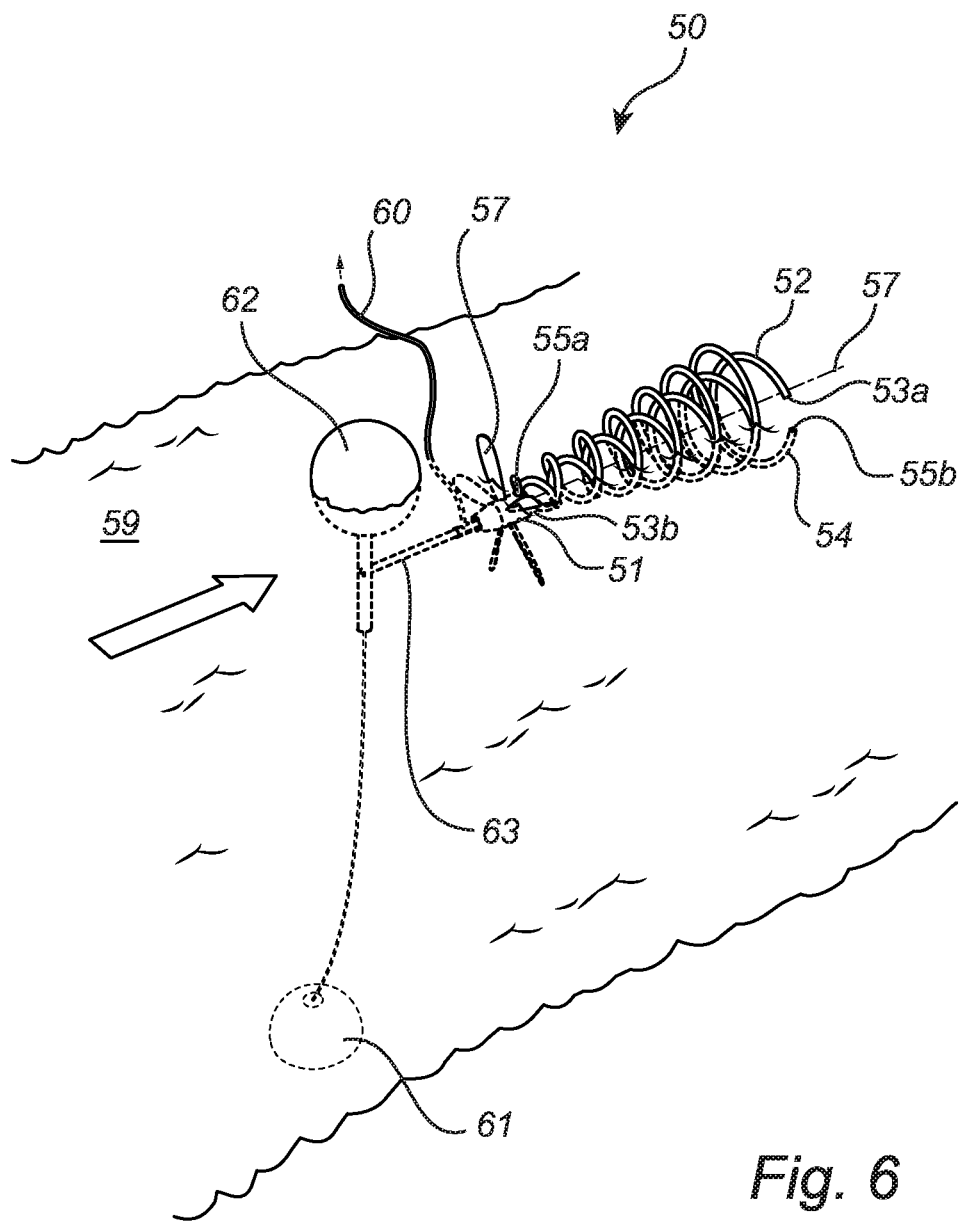
FIG. 6 schematically illustrates an apparatus according to a second embodiment of the present invention, in the form of a water pump arranged in a flowing body of water.

A second embodiment of the apparatus according to the present invention, in the form of a water pump arranged in a flowing body of water, is schematically illustrated in FIG. 6.

The water pump 50 comprises a first fluid separator 51, a first fluid conduit 52 having a first open end 53a and a second open end 53b, and a second fluid conduit 54 having a first open end 55a and a second open end 55b. The second open end 53b of the first fluid conduit 52 and the first open end 55a of the second fluid conduit 54 are fluid flow connected to the first fluid separator 51. The first fluid conduit 52 is coiled around an axis of rotation 57 of the water pump 50 in a clock-wise direction as seen from the first open end 53a of the first fluid conduit 52, and the second fluid conduit 54 is coiled around the axis of rotation 57 in a counter clock-wise direction as seen from the second open end 55b of the second fluid conduit 54.

As is schematically indicated in FIG. 6, the first fluid separator 51 is provided with rotor blades 57.

As shown in FIG. 6, the water pump 50 is arranged in a flowing body of water, in this case a river 59, and is structured to float in the water of the river 59 in such a way that, when the rotor (the first fluid separator 51) rotates the first open end 53a of the first fluid conduit 52, and the second open end 55b of the second fluid conduit 54 are alternatingly in the air and in the water. The rotor blades 57 are configured to rotate the rotor of the water pump 50 (the fluid separator 51 and the first 52 and second 54 fluid conduits) counter clock-wise around the axis of rotation 57 as seen from the right hand side of FIG. 6.

The water pump 50 in FIG. 6 is attached to a mooring arrangement comprising an anchor 61, a buoy 62 and a tether 63 for holding the water pump 50 in the flowing water of the river 59.

The water pump 50 in FIG. 6 will, in principle, function in the same way as the compressor described above with reference to FIG. 2, FIGS. 3a-d and FIGS. 4a-b with the river 59 functioning as the second fluid separator 6b in FIG. 2. The main differences between the water pump 50 in FIG. 6 and the compressor in FIG. 2 are that the river 59 provides the rotation, water rather than air is net transported, and that the first fluid separator 51 functions according to another fluid separation principle than the first fluid separator 6a in FIG. 2. The water output from the fluid separator 51 is transported to a higher vertical level using a hose 60. The functioning of the first fluid separator 51 will be described below with reference to FIG. 7.

Figure 7:
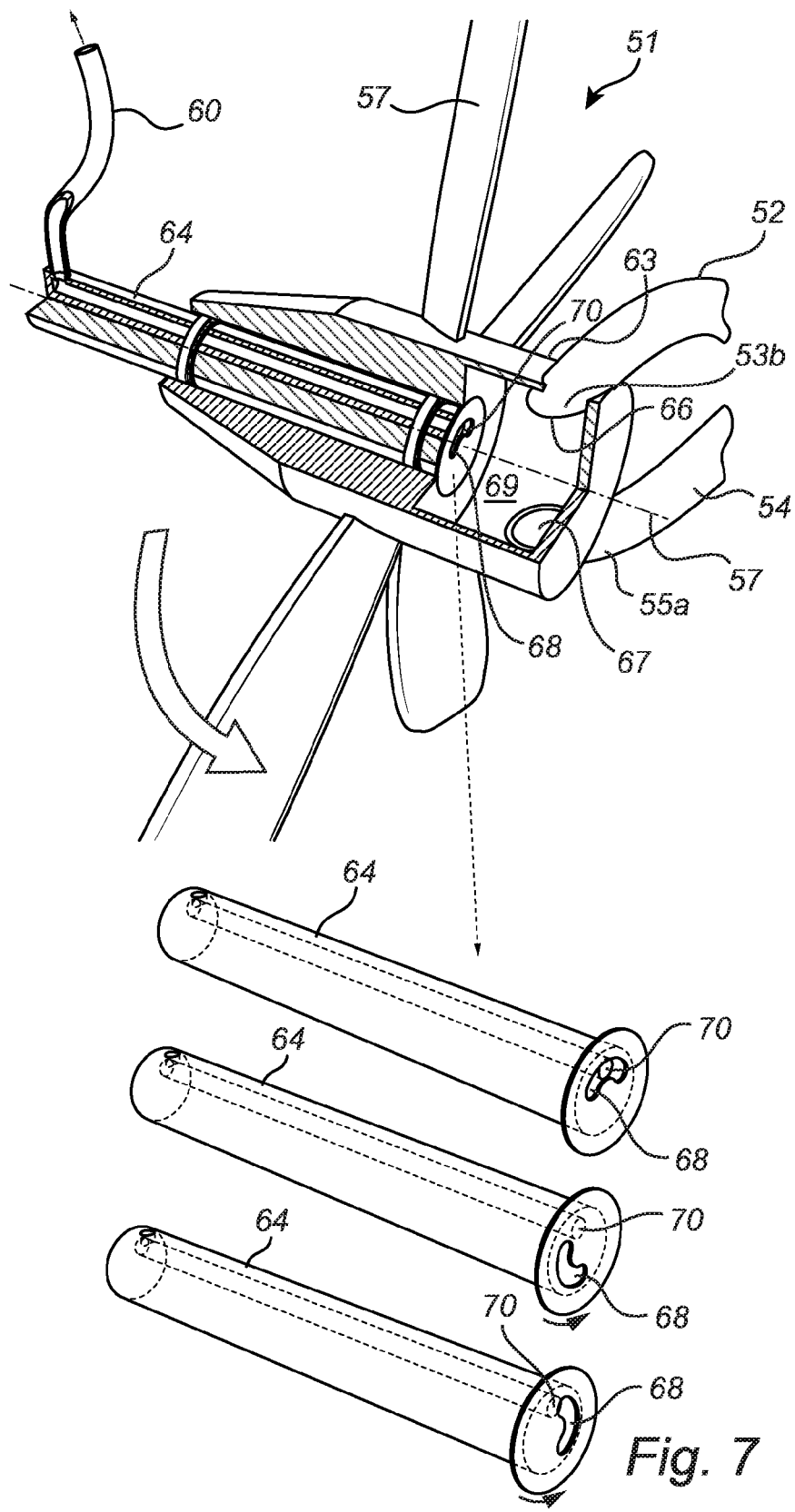
FIG. 7 schematically illustrates the first fluid separator comprised in the water pump in FIG. 6.

Referring to FIG. 7, the fluid separator 51 comprises a rotating part (a rotor) 63, and a relatively stationary part 64. The stationary part 64 is attached to the buoy 62 via the above-mentioned tether 63 (not shown in FIG. 7), and is hollow as is schematically indicated in FIG. 7 to allow flow of water from the interior of the fluid separator 51 to the hose 60 that is connected to the stationary part 64.

The stationary part 64 is coupled to the rotating part 63 via a per se known swivel coupling.

As is schematically indicated in FIG. 7, the rotating part 63 of the fluid separator 51 comprises an inlet 66 in fluid flow connection with the second open end 53b of the first fluid conduit 52, and a first outlet 67 in fluid flow connection with the first open end 55a of the second fluid conduit 54, and a second outlet 68 in fluid flow connection with the stationary part 64 as is indicated in FIG. 7. The inlet 66, and the first 67 and second 68 outlets are fluid flow connected to an interior chamber 69 in the rotating part.

Due to the slit-like shape of the second outlet 68 and the off-axis position of the inlet 70 of the stationary part 64, fluid flow between the interior chamber 69 and the inlet 70 of the stationary part 64 will be intermittently permitted, and intermittently prevented. By tuning the angular position and length of the arc-shaped slit to the timing of the incoming batches of water introduced from the first fluid conduit 52 through the inlet 66, water can be separated and provided as a pulsating flow via the stationary part 64 to the hose 60.

It should be understood that the exemplary fluid separator explained above is only a simplified example of a purely mechanical valve arrangement. One skilled in the art will be able to realize the desired fluid separation functionality with other types of mechanical valves and/or electrically controlled valves without undue burden.

Figure 8:
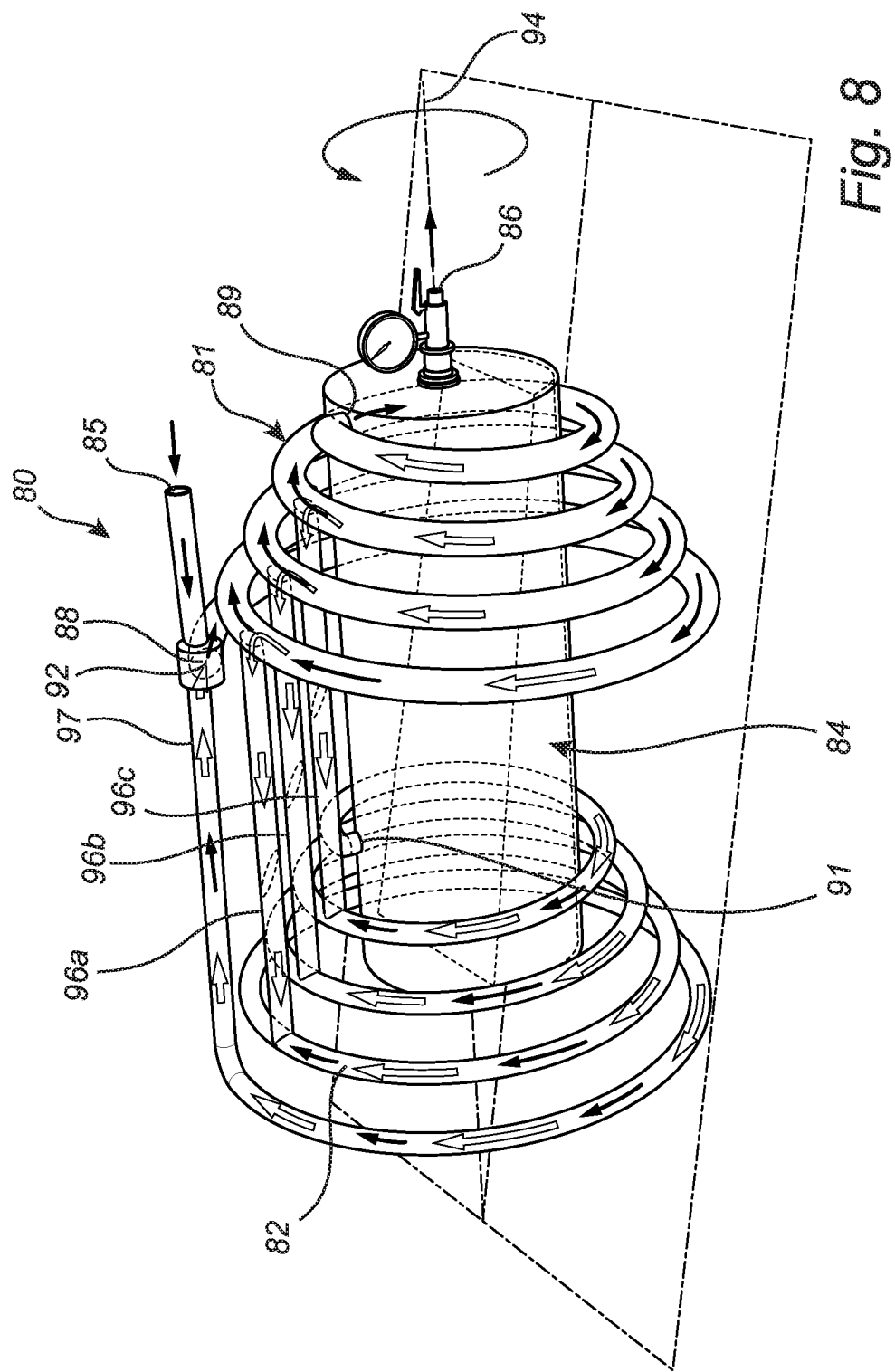
FIG. 8 schematically illustrates an apparatus according to a third embodiment of the present invention, in the form of a compressor.

FIG. 8 schematically shows a third embodiment of the apparatus according to the present invention, in the form of a compressor 80. Referring to FIG. 8, the compressor 80 comprises a first fluid conduit 81 a second fluid conduit 82, a fluid separator 84, an air inlet 85, and an air outlet 86.

The first fluid conduit 81 has a first open end 88, and a second open end 89, and the second fluid conduit 82 has a first open end 91 and a second open end 92.

Each of the second open end 89 of the first fluid conduit 81 and the first open end 91 of the second fluid conduit 82 is in fluid flow connection with the fluid separator 84. Further, the second open end 92 of the second fluid conduit 82 and the air inlet 85 are both fluid flow connected to the first open end 88 of the first fluid conduit 81.

As can be seen in FIG. 8, the first fluid conduit 81 is coiled around the rotational axis 94 of the compressor 80 in a first rotational direction, and the second fluid conduit 82 is coiled around the rotational axis 94 in a second rotational direction, opposite the first rotational direction.

Furthermore, the inner diameter of the first fluid conduit 81 is greater than the inner diameter of the second fluid conduit 82 to provide for a net flow of air from the air inlet 85 to the fluid separator 84.

In general, the function of the compressor 80 in FIG. 8 is similar to the function of the compressor 11 described further above with reference to FIG. 2. Rotation of the first 81 and second 82 fluid conduits (and the fluid separator 84) around the rotational axis 94 in the rotational direction indicated in FIG. 8 will result in a net flow of air from the air inlet 85 to the fluid separator 84 to allow extraction of pressurized air through the air outlet 86.

A difference is, however, that the compressor 80 in FIG. 8 is provided with a plurality of interconnecting conduits 96a-c that fluid flow connect the first fluid conduit 81 with the second fluid conduit 82 between the respective first and second open ends thereof. In addition, the compressor 80 comprises a circulation conduit 97 for connecting the second open end 92 of the second fluid conduit 82 with the first open end 88 of the first fluid conduit 81, in order to provide the water (block arrows) that exits the second fluid conduit 82 to the first conduit 81 to achieve a closed loop system for the water at least. Air (filled arrows) that exits the second fluid conduit 82 is also provided to the first fluid conduit 81. Due to the net flow of air through the apparatus, additional air is added through the air inlet 85 as is schematically indicated in FIG. 8.

In FIG. 8, the circulation conduit 97 is indicated as a straight pipe being parallel with the rotational axis 94. It should be noted that this is not necessary, and that another configuration, such as a coiled circulation conduit 97 may be beneficial.

As is schematically indicated in FIG. 8, the interconnecting conduits 96a-c mainly provide water from the first fluid conduit 81 to the second fluid conduit 82 at several locations between the respective first open ends and the respective second open ends. This allows for a greater pressure differential along the first fluid conduit 81, which in turn provides for a more compact compressor.

An apparatus for converting fluid flow to rotation would also benefit, in the same way, from the provision of interconnecting conduits, and circulation conduit, regardless of how pressure is increased in the fluid separator for bringing about the desired net torque resulting in rotation around the rotational axis.

Figure 9:
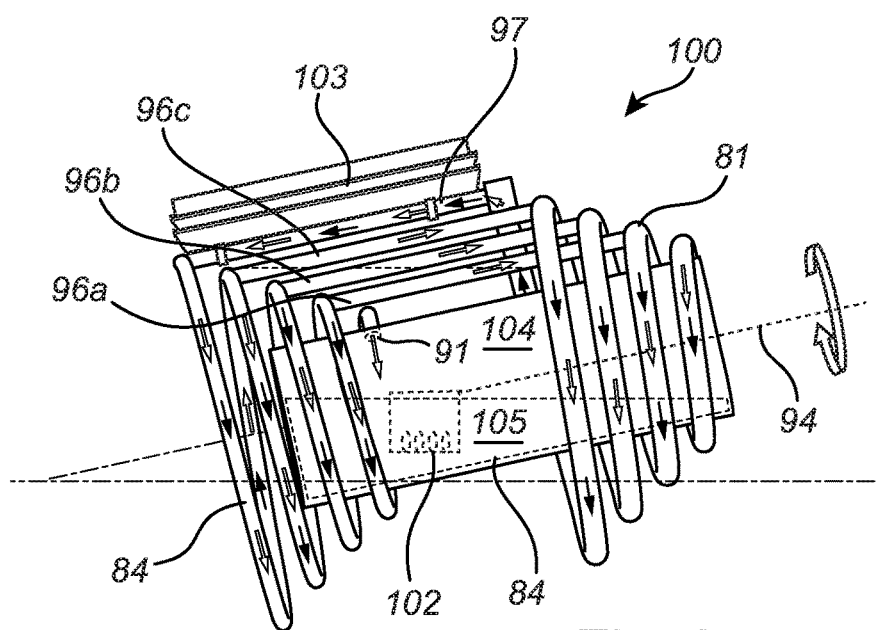
FIG. 9 schematically illustrates an apparatus according to a third embodiment of the present invention, in the form of a heat engine.

FIG. 9 schematically shows an example of such an apparatus, in the form of a schematic heat engine 100. The configuration of the heat engine 100 in FIG. 9 is basically the same as that of the compressor 80 in FIG. 8. However, the heat engine 100 in FIG. 9 lacks air inlet and air outlet, and is further provided with a heater 102, and a cooling arrangement 103.

In this particular example, the heater 102 is provided in the form of an electric heater arranged to heat the water 105 in the fluid separator 84. The heating of the water 105 in turn results in heating and expansion of the air 104 in the fluid separator 84. The expansion of the air 104 results in the asymmetric displacement of water slugs in the first 81 and second 82 fluid conduits described further above in connection with FIG. 5, which in turn results in rotation around the rotational axis 94. To sustain the rotation, it will be necessary to remove heat from the heat engine 100 at a suitable location. FIG. 9 schematically shows a cooling arrangement in the form of a heat sink 103 with cooling fins arranged at the circulation conduit 97.

It should, however, be noted that several other ways of supplying and removing heat from the heat engine 100 are feasible and well within reach of one of ordinary skill in the art.

In analogy to what has been described further above for other embodiments, the heat engine 100 may be converted to a heat pump with minor modifications. In a heat pump, mechanical energy—in this case rotational energy—may be used to extract heat from a cold area and supply heat to a warmer area.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An apparatus for converting rotation into fluid flow, comprising:
    a first fluid conduit extending from a first open end to a second open end of the first fluid conduit, said first fluid conduit being coiled around a first axis of rotation;
    a second fluid conduit extending from a first open end to a second open end of the second fluid conduit, said second fluid conduit being coiled around a second axis of rotation;
    a rotor coupled to said first fluid conduit and to said second fluid conduit in such a way that rotation of said rotor causes said first fluid conduit to rotate around said first axis of rotation and said second fluid conduit to rotate around said second axis of rotation;
    a first fluid separator for separating a first fluid having a first density from a second fluid having a second density different from said first density, said first fluid separator being in fluid flow communication with the second open end of said first fluid conduit, and in fluid flow communication with the first open end of said second fluid conduit; and
an outlet allowing extraction of said first fluid from said first fluid separator,
wherein said first fluid separator is configured in such a way that, during rotation of said rotor in a first direction of rotation, first mass portions of said first fluid and second mass portions of said second fluid are alternatingly transported from the first open end towards the second open end of said first fluid conduit, third mass portions of said first fluid and fourth mass portions of said second fluid are alternatingly transported from the first open end towards the second open end of the second fluid conduit,
wherein a ratio between each of said first mass portions and each of said second mass portions is greater than a ratio between each of said third mass portions and each of said fourth mass portions.

2. An apparatus for converting fluid flow into rotation, comprising:
a first fluid conduit for accommodating transport of a first fluid and a second fluid different from the first fluid through said first fluid conduit, said first fluid conduit extending from a first open end to a second open end of the first fluid conduit, said first fluid conduit being coiled around a first axis of rotation;
a second fluid conduit for accommodating transport of said first fluid and said second fluid through said second fluid conduit, said second fluid conduit extending from a first open end to a second open end of the second fluid conduit, said second fluid conduit being coiled around a second axis of rotation;
a rotor coupled to said first fluid conduit and to said second fluid conduit in such a way that rotation of said rotor causes said first fluid conduit to rotate around said first axis of rotation and said second fluid conduit to rotate around said second axis of rotation;
a first fluid separator for separating said first fluid from said second fluid, said first fluid separator being in fluid flow communication with the second open end of said first fluid conduit, and in fluid flow communication with the first open end of said second fluid conduit; and
means for increasing pressure in said first fluid separator,
wherein said first fluid separator is configured in such a way that when pressure is increased in said first fluid separator, said first and second fluids are displaced in said first fluid conduit and in said second fluid conduit to provide a net torque acting on said rotor, resulting in rotation of said rotor.

3. The apparatus according to claim 2, wherein said means for increasing pressure comprise an inlet for allowing supply of said first fluid into said first fluid separator.

4. The apparatus according to claim 2, wherein said means for increasing pressure comprise a heater for heating said first and second fluid in said first fluid conduit.

5. The apparatus according to claim 4, further comprising cooling means for cooling said first and second fluid in said second fluid conduit.

6. The apparatus according to claim 1, wherein said first fluid is a gas and said second fluid is a liquid.

7. The apparatus according to claim 1, wherein said first and second axes of rotation coincide and constitute a common axis of rotation.

8. The apparatus according to claim 7, wherein:
said first fluid conduit is coiled around said common axis of rotation in a first angular direction; and
said second fluid conduit is coiled around said common axis of rotation in a second angular direction opposite to said first angular direction.

9. The apparatus according to claim 7, wherein said first fluid separator comprises a first container coupled to said first fluid conduit and said second fluid conduit to rotate around said common axis of rotation together with said first fluid conduit and said second fluid conduit.

10. The apparatus according to claim 7, wherein:
said first fluid conduit, starting from the first open end of said first fluid conduit, is coiled at least a first revolution and a last revolution around said common axis of rotation; and
said first revolution is at a greater radial distance from said common axis of rotation than said last revolution.

11. The apparatus according to claim 7, wherein:
said second fluid conduit, starting from the first open end of said second fluid conduit, is coiled at least a first revolution and a last revolution around said common axis of rotation; and
said first revolution is at a smaller radial distance from said common axis of rotation than said last revolution.

12. The apparatus according to claim 9, wherein the second open end of said first fluid conduit is fluid flow connected to said first container at a first connection location and the first open end of said second fluid conduit is fluid flow connected to said first container at a second connection location,
wherein, when said apparatus is in operation:
said common axis of rotation forms an angle in relation to a horizontal plane;
said first connection location rotates around said common axis of rotation centered at a first vertical position along said common axis of rotation; and
said second connection location rotates around said common axis of rotation centered at a second vertical position along said common axis of rotation,
said first vertical position being higher than said second vertical position.

13. The apparatus according to claim 1, further comprising at least one interconnecting conduit having a first end and a second end,
wherein the first end of said interconnecting conduit is in fluid flow connection with said first fluid conduit and the second end of said interconnecting conduit is in fluid flow connection with said second fluid conduit to allow fluid flow between said first fluid conduit and said second fluid conduit.

14. The apparatus according to claim 13, wherein:
the first end of said interconnecting conduit is connected to said first fluid conduit at a connection location between the first and second ends of said first fluid conduit; and
the second end of said interconnecting conduit is connected to said second fluid conduit at a connection location between the first and second ends of said second fluid conduit.

15. The apparatus according to claim 13, comprising a plurality of interconnecting conduits fluid flow connecting said first and second fluid conduits between different connection locations.

16. The apparatus according to claim 1, wherein said apparatus further comprises an electric motor/generator including said rotor.

17. The apparatus according to claim 1, wherein said rotor is configured to be rotated by said first or second fluid flowing past said rotor.

18. The apparatus according to claim 1, wherein said apparatus is arrangeable at an interface between said first fluid and said second fluid in such a way that when said rotor rotates in said first direction of rotation, first fluid and the second fluid are alternately supplied to the first open end of said first fluid conduit.

19. The apparatus according to claim 18, wherein said first fluid is air and said second fluid is water, and said apparatus is structured to float in water in such a way that, when said rotor rotates in said first direction of rotation, the first open end of said first fluid conduit is alternatingly in said air and alternately in said water.

20. The apparatus according to claim 1, wherein said apparatus further comprises a second fluid separator for separating said first fluid from said second fluid, said second fluid separator being in fluid flow communication with the first open end of said first fluid conduit, and in fluid flow communication with the second open end of said second fluid conduit.

21. The apparatus according to claim 20, wherein:
said first and second axes of rotation coincide and constitute a common axis of rotation; and
said second fluid separator comprises a second container coupled to said first fluid conduit and said second fluid conduit to rotate around said common axis of rotation together with said first fluid conduit and said second fluid conduit.

22. The apparatus according to claim 21, wherein the first open end of said first fluid conduit is fluid flow connected to said second container at a first connection location and the second open end of said second fluid conduit is fluid flow connected to said second container at a second connection location,
wherein, when said apparatus is in operation:
said common axis of rotation forms an angle in relation to a horizontal plane;
said first connection location rotates around said common axis of rotation centered at a first vertical position along said common axis of rotation; and
said second connection location rotates around said common axis of rotation centered at a second vertical position along said common axis of rotation,
said first vertical position being higher than said second vertical position.

23. A multi-stage apparatus comprising:
a first apparatus according to claim 20; and
a second apparatus according to claim 20,
wherein the first fluid separator comprised in said first apparatus constitutes the second fluid separator comprised in said second apparatus.

24. A method of converting rotation into fluid flow using an apparatus comprising:
a first fluid conduit extending from a first open end to a second open end of the first fluid conduit, said first fluid conduit being coiled around a first axis of rotation;
a second fluid conduit extending from a first open end to a second open end of the second fluid conduit, said second fluid conduit being coiled around a second axis of rotation; and
a first fluid separator for separating said first fluid from a second fluid having a second density different from said first density, said first fluid separator being in fluid flow communication with the second open end of said first fluid conduit, and in fluid flow communication with the first open end of said second fluid conduit,
said method comprising the steps of:
rotating said first fluid conduit around said first axis of rotation;
rotating said second fluid conduit around said second axis of rotation;
alternatingly providing a plurality of first mass portions of said first fluid and a plurality of second mass portions of said second fluid to the first open end of said first fluid conduit;
alternatingly providing, from said fluid separator, a plurality of third mass portions of said first fluid and a plurality of fourth mass portions of a second fluid to the first end of said second fluid conduit,
wherein a ratio between each of said first mass portions and each of said second mass portions is substantially greater than a ratio between each of said third mass portions and each of said fourth mass portions; and
extracting first fluid from said fluid separator.

25. A method of converting fluid flow into rotation using an apparatus comprising:
a first fluid conduit for accommodating transport of a first fluid and a second fluid different from the first fluid through said first fluid conduit, said first fluid conduit extending from a first open end to a second open end of the first fluid conduit, said first fluid conduit being coiled around a first axis of rotation;
a second fluid conduit for accommodating transport of said first fluid and said second fluid through said second fluid conduit, said second fluid conduit extending from a first open end to a second open end of the second fluid conduit, said second fluid conduit being coiled around a second axis of rotation; and
a first fluid separator for separating said first fluid from said second fluid, said first fluid separator being in fluid flow communication with the second open end of said first fluid conduit, and in fluid flow communication with the first open end of said second fluid conduit
said method comprising the steps of:
configuring said first fluid separator in such a way that when pressure is increased in said first fluid separator, said first and second fluids are displaced in said first fluid conduit and in said second fluid conduit to provide a net torque acting on said rotor, resulting in rotation of said rotor; and
increasing pressure in said first fluid separator.

26. An apparatus for converting rotation into fluid flow, comprising:
a first fluid conduit extending from a first open end to a second open end of the first fluid conduit, said first fluid conduit being coiled around a first axis of rotation;
a second fluid conduit extending from a first open end to a second open end of the second fluid conduit;
a rotor coupled to said first fluid conduit in such a way that rotation of said rotor causes said first fluid conduit to rotate around said first axis of rotation;
a first fluid separator for separating a first fluid having a first density from a second fluid having a second density different from said first density, said first fluid separator being in fluid flow communication with the second open end of said first fluid conduit, and in fluid flow communication with the first open end of said second fluid conduit; and
an outlet allowing extraction of said first fluid from said first fluid separator,
wherein said first fluid separator is configured in such a way that, during rotation of said rotor in a first direction of rotation, first mass portions of said first fluid and second mass portions of said second fluid are alternatingly transported from the first open end towards the second open end of said first fluid conduit, third mass portions of said first fluid and fourth mass portions of said second fluid are alternatingly transported from the first open end towards the second open end of the second fluid conduit, wherein a ratio between each of said first mass portions and each of said second mass portions is greater than a ratio between each of said third mass portions and each of said fourth mass portions.

27. An apparatus for converting fluid flow into rotation, comprising:
   a first fluid conduit for accommodating transport of a first fluid and a second fluid different from the first fluid through said first fluid conduit, said first fluid conduit extending from a first open end to a second open end of the first fluid conduit, said first fluid conduit being coiled around a first axis of rotation;
   a second fluid conduit for accommodating transport of said first fluid and said second fluid through said second fluid conduit, said second fluid conduit extending from a first open end to a second open end of the second fluid conduit;
   a rotor coupled to said first fluid conduit in such a way that rotation of said rotor causes said first fluid conduit to rotate around said first axis of rotation;
   a first fluid separator for separating said first fluid from said second fluid, said first fluid separator being in fluid flow communication with the second open end of said first fluid conduit, and in fluid flow communication with the first open end of said second fluid conduit; and means for increasing pressure in said first fluid separator, wherein said first fluid separator is configured in such a way that when pressure is increased in said first fluid separator, said first and second fluids are displaced in said first fluid conduit to provide a net torque acting on said rotor, resulting in rotation of said rotor.

* * * * *